(12) United States Patent
Bravo et al.

(10) Patent No.: US 7,979,616 B2
(45) Date of Patent: Jul. 12, 2011

(54) SYSTEM AND METHOD FOR PROVIDING A CONFIGURABLE COMMAND SEQUENCE FOR A MEMORY INTERFACE DEVICE

(75) Inventors: Elianne A. Bravo, Wappingers Falls, NY (US); Kevin C. Gower, LaGrangeville, NY (US); Dustin J. VanStee, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 11/767,118

(22) Filed: Jun. 22, 2007

(65) Prior Publication Data
US 2008/0320191 A1 Dec. 25, 2008

(51) Int. Cl.
G06F 13/00 (2006.01)
G06F 3/00 (2006.01)
G06F 5/00 (2006.01)
G06F 11/00 (2006.01)
G06F 12/00 (2006.01)
G06F 13/28 (2006.01)

(52) U.S. Cl. .............. 710/107; 710/60; 714/5; 714/43; 711/104; 711/105; 711/115

(58) Field of Classification Search ............... 710/107, 710/60; 714/5, 43; 711/104, 105, 115
See application file for complete search history.

(56) References Cited

U.S. PATENT DOCUMENTS

| | | | |
|---|---|---|---|
| 4,010,450 A * | 3/1977 | Porter et al. | 714/5 |
| 4,503,535 A * | 3/1985 | Budde et al. | 714/47 |
| 4,723,120 A | 2/1988 | Petty, Jr. | |
| 4,952,930 A * | 8/1990 | Franaszek et al. | 340/2.23 |

(Continued)

FOREIGN PATENT DOCUMENTS

EP 838759 A2 * 4/1998

(Continued)

OTHER PUBLICATIONS

Ramasubramanian et al., "Dual-Link Failure Resiliency Through Backup Link Mutual Exclusion", Feb. 2008, IEEE, IEEE/ACM Transactions on Networking, vol. 16, No. 1, pp. 157-169.*

(Continued)

Primary Examiner — Faisal M Zaman
(74) Attorney, Agent, or Firm — Cantor Colburn LLP; William A. Kinnaman, Jr.

(57) ABSTRACT

A system and method for providing a configurable command sequence for a memory interface device (MID). The system includes a MID intended for use in a cascade interconnect system and in communication with one or more memory devices. The MID includes a first connection to a high speed bus operating at a first data rate, a second connection to the high speed bus, an alternate communication means and logic. The first connection to the high speed bus includes receiver circuitry operating at the first data rate. The alternate communication means operates at a second data rate that is slower than the first data rate. The logic facilitates receiving commands via the first connection from the high speed bus operating at the first data rate and using a first command sequence. The logic also facilitates receiving the commands via the alternate communication means using a second command sequence which differs from the first command sequence in the speed in which the commands are transferred. The logic further facilitates processing the commands if the commands are directed to the MID and redriving the commands via the second connection onto the high speed bus.

20 Claims, 16 Drawing Sheets

U.S. PATENT DOCUMENTS

| | | | |
|---|---|---|---|
| 5,369,748 A * | 11/1994 | McFarland et al. | 710/309 |
| 5,513,135 A | 4/1996 | Dell et al. | |
| 5,610,945 A * | 3/1997 | Gregg et al. | 375/260 |
| 5,623,687 A | 4/1997 | Yishay et al. | |
| 5,652,844 A | 7/1997 | Harwood, III | |
| 5,687,371 A | 11/1997 | Lee et al. | |
| 5,938,728 A | 8/1999 | Swork et al. | |
| 5,968,156 A | 10/1999 | Kim | |
| 6,052,738 A | 4/2000 | Muller et al. | |
| 6,125,463 A | 9/2000 | Macchi | |
| 6,173,382 B1 | 1/2001 | Dell et al. | |
| 6,182,192 B1 | 1/2001 | Rovati | |
| 6,199,131 B1 | 3/2001 | Melo et al. | |
| 6,452,848 B1 | 9/2002 | Obremski et al. | |
| 6,467,003 B1 * | 10/2002 | Doerenberg et al. | 710/117 |
| 6,490,638 B1 * | 12/2002 | Ha et al. | 710/15 |
| 6,505,305 B1 * | 1/2003 | Olarig | 714/5 |
| 6,510,100 B2 | 1/2003 | Grundon et al. | |
| 6,571,346 B1 | 5/2003 | Dreps et al. | |
| 6,587,912 B2 | 7/2003 | Leddige et al. | |
| 6,671,753 B2 | 12/2003 | Dreps et al. | |
| 6,731,607 B1 | 5/2004 | Mantin | |
| 6,904,486 B2 | 6/2005 | Van Dyke et al. | |
| 6,988,154 B2 | 1/2006 | Latta | |
| 7,096,307 B2 | 8/2006 | Moyer | |
| 7,471,219 B1 * | 12/2008 | Lastras-Montano | 341/83 |
| 7,539,800 B2 * | 5/2009 | Dell et al. | 710/100 |
| 7,624,244 B2 * | 11/2009 | Yung et al. | 711/167 |
| 7,636,813 B2 * | 12/2009 | Tremaine | 711/137 |
| 7,721,140 B2 * | 5/2010 | Dell et al. | 714/5 |
| 7,725,762 B2 * | 5/2010 | Bartley et al. | 714/5 |
| 7,895,374 B2 * | 2/2011 | Ferraiolo et al. | 710/51 |
| 2002/0056063 A1 * | 5/2002 | Nerl | 714/733 |
| 2005/0021844 A1 * | 1/2005 | Puon et al. | 709/238 |
| 2006/0036826 A1 | 2/2006 | Dell | |
| 2006/0095629 A1 * | 5/2006 | Gower et al. | 710/305 |
| 2006/0179369 A1 | 8/2006 | Bravo et al. | |
| 2006/0217917 A1 * | 9/2006 | Abe | 702/119 |
| 2006/0221818 A1 * | 10/2006 | Alves et al. | 370/217 |
| 2007/0011511 A1 | 1/2007 | Griseta et al. | |
| 2008/0005455 A1 | 1/2008 | Macri et al. | |
| 2008/0034148 A1 * | 2/2008 | Gower et al. | 711/5 |
| 2009/0006886 A1 * | 1/2009 | O'Connor et al. | 714/5 |
| 2009/0187794 A1 * | 7/2009 | Kim et al. | 714/43 |
| 2010/0162037 A1 * | 6/2010 | Maule et al. | 714/5 |
| 2010/0191894 A1 * | 7/2010 | Bartley et al. | 711/5 |

FOREIGN PATENT DOCUMENTS

| | | | |
|---|---|---|---|
| EP | 1014268 A2 * | 6/2000 | |
| JP | 62118693 A * | 5/1987 | |
| JP | 07154379 A * | 6/1995 | |
| JP | 10207782 A * | 8/1998 | |
| JP | 2000195289 A * | 7/2000 | |
| JP | 2004280787 A * | 10/2004 | |

OTHER PUBLICATIONS

Vekiarides, N., "Fault-tolerant disk storage and file systems using reflective memory", Jan. 3-6, 1995, IEEE, Proceedings of the Twenty-Eighth Hawaii International Conference on System Sciences, vol. 1, pp. 103-113.*

* cited by examiner

| DOWNSTREAM FORMAT: 9 DATA + 8 CMD + 4 ECC + 1 SPARE + 1 DIFF CLK = 24 WIRES | | | | | | | | | | | | | | | | | | | | | | |
|---|---|---|---|---|---|---|---|---|---|---|---|---|---|---|---|---|---|---|---|---|---|---|
| s3_us(#) d3_s3(#) | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
| Xfer/Bit | SPARE | ECC0 | ECC1 | ECC2 | ECC3 | DI0 | DI1 | DI2 | DI3 | DI4 | DI5 | DI6 | DI7 | DI8 | C0 | C1 | C2 | C3 | C4 | C5 | C6 | C7 |
| 0 | S0 | E00 | E10 | E20 | E30 | D00 | D10 | D20 | D30 | D40 | D50 | D60 | D70 | D80 | C00 | C10 | C20 | C30 | C40 | C50 | C60 | C70 |
| 1 | S1 | E01 | E11 | E21 | E31 | D01 | D11 | D21 | D31 | D41 | D51 | D61 | D71 | D81 | C01 | C11 | C21 | C31 | C41 | C51 | C61 | C71 |
| 2 | S2 | E02 | E12 | E22 | E32 | D02 | D12 | D22 | D32 | D42 | D52 | D62 | D72 | D82 | C02 | C12 | C22 | C32 | C42 | C52 | C62 | C72 |
| 3 | S3 | E03 | E13 | E23 | E33 | D03 | D13 | D23 | D33 | D43 | D53 | D63 | D73 | D83 | C03 | C13 | C23 | C33 | C43 | C53 | C63 | C73 |
| 4 | S4 | E04 | E14 | E24 | E34 | D04 | D14 | D24 | D34 | D44 | D54 | D64 | D74 | D84 | C04 | C14 | C24 | C34 | C44 | C54 | C64 | C74 |
| 5 | S5 | E05 | E15 | E25 | E35 | D05 | D15 | D25 | D35 | D45 | D55 | D65 | D75 | D85 | C05 | C15 | C25 | C35 | C45 | C55 | C65 | C75 |
| 6 | S6 | E06 | E16 | E26 | E36 | D06 | D16 | D26 | D36 | D46 | D56 | D66 | D76 | D86 | C06 | C16 | C26 | C36 | C46 | C56 | C66 | C76 |
| 7 | S7 | E07 | E17 | E27 | E37 | D07 | D17 | D27 | D37 | D47 | D57 | D67 | D77 | D87 | C07 | C17 | C27 | C37 | C47 | C57 | C67 | C77 |

SPARE BITS 1002

E: ECC CHECK BITS 1004

D: WRITE DATA BITS 1006

C: COMMAND BITS 1008

UPSTREAM FORMAT: 18 DATA + 4 ECC + 1 SPARE + 1 DIFF CLK = 25 TOTAL WIRES

| s3_us(#) ds_s3(#) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| Xfer/Bit | spare | ecc0 | ecc1 | ecc2 | ecc3 | do0 | do1 | do2 | do3 | do4 | do5 | do6 | do7 | do8 | do9 | do10 | do11 | do12 | do13 | do14 | do15 | do16 | do17 |
| 0 | S0 | E00 | E10 | E20 | E30 | D00 | D10 | D20 | D30 | D40 | D50 | D60 | D70 | D80 | D90 | D100 | D110 | D120 | D130 | D140 | D150 | D160 | D170 |
| 1 | S1 | E01 | E11 | E21 | E31 | D01 | D11 | D21 | D31 | D41 | D51 | D61 | D71 | D81 | D91 | D101 | D111 | D121 | D131 | D141 | D151 | D161 | D171 |
| 2 | S2 | E02 | E12 | E22 | E32 | D02 | D12 | D22 | D32 | D42 | D52 | D62 | D72 | D82 | D92 | D102 | D112 | D122 | D132 | D142 | D152 | D162 | D172 |
| 3 | S3 | E03 | E13 | E23 | E33 | D03 | D13 | D23 | D33 | D43 | D53 | D63 | D73 | D83 | D93 | D103 | D113 | D123 | D133 | D143 | D153 | D163 | D173 |
| 4 | S4 | E04 | E14 | E24 | E34 | D04 | D14 | D24 | D34 | D44 | D54 | D64 | D74 | D84 | D94 | D104 | D114 | D124 | D134 | D144 | D154 | D164 | D174 |
| 5 | S5 | E05 | E15 | E25 | E35 | D05 | D15 | D25 | D35 | D45 | D55 | D65 | D75 | D85 | D95 | D105 | D115 | D125 | D135 | D145 | D155 | D165 | D175 |
| 6 | S6 | E06 | E16 | E26 | E36 | D06 | D16 | D26 | D36 | D46 | D56 | D66 | D76 | D86 | D96 | D106 | D116 | D126 | D136 | D146 | D156 | D166 | D176 |
| 7 | S7 | E07 | E17 | E27 | E37 | D07 | D17 | D27 | D37 | D47 | D57 | D67 | D77 | D87 | D97 | D107 | D117 | D127 | D137 | D147 | D157 | D167 | D177 |

SPARE BITS 1010

ECC CHECK BITS 1012

READ DATA BITS 1014

Write Slow Address/Data Buffer

| Bits | Xfer 0-7 | Xfer 0-7 | Xfer 0-7 |
|---|---|---|---|
| C0 | '000' | '001' | '000' |
| C1 | Idle | Slow Command | Idle |
| C2 | | | |
| C3 | '01' | '01' | '01' |
| C4 | Write Slow Data Buffer | Write Slow Data Buffer | Write Slow Data Buffer |
| C5 | Slow Data Buffer Pointer | Slow Data Buffer Pointer | Slow Data Buffer Pointer |
| C6 | (0:2) | (0:2) | (0:2) |
| C7 | | | |
| D0 | -Data/Address | -Data/Address | -Data/Address |
| D1 | Buffer Data (0:7) | Buffer Data (0:7) | Buffer Data (0:7) |
| D2 | | | |
| D3 | | | |
| D4 | | | |
| D5 | | | |
| D6 | | | |
| D7 | | | |
| D8 | | | |

FIG. 14

Write SCOM Register to Slow Data Buffer

| Bits | Xfer 0-7 | Xfer 0-7 | Xfer 0-7 |
|---|---|---|---|
| C0<br>C1<br>C2 | '000'<br>Idle | '001'<br>Slow Command | '000'<br>Idle |
| C3<br>C4 | '11'<br>Write SCOM Register from Slow Data Buffer | '11'<br>Write SCOM Register from Slow Data Buffer | '11'<br>Write SCOM Register from Slow Data Buffer |
| C5<br>C6<br>C7 | DIMM<br>Select(0:2) | DIMM<br>Select(0:2) | DIMM<br>Select(0:2) |

FIG. 15

SYSTEM AND METHOD FOR PROVIDING A CONFIGURABLE COMMAND SEQUENCE FOR A MEMORY INTERFACE DEVICE

BACKGROUND OF THE INVENTION

This invention relates generally to computer memory, and more particularly to providing a configurable command sequence for a memory interface device.

Contemporary high performance computing main memory systems are generally composed of one or more dynamic random access memory (DRAM) devices, which are connected to one or more processors via one or more memory control elements. Overall computer system performance is affected by each of the key elements of the computer structure, including the performance/structure of the processor(s), any memory cache(s), the input/output (I/O) subsystem(s), the efficiency of the memory control function(s), the main memory device(s), and the type and structure of the memory interconnect interface(s).

Extensive research and development efforts are invested by the industry, on an ongoing basis, to create improved and/or innovative solutions to maximizing overall system performance and density by improving the memory system/sub-system design and/or structure. High-availability systems present further challenges as related to overall system reliability due to customer expectations that new computer systems will markedly surpass existing systems in regard to mean-time-between-failure (MTBF), in addition to offering additional functions, increased performance, increased storage, lower operating costs, etc. Other frequent customer requirements further exacerbate the memory system design challenges, and include such items as ease of upgrade and reduced system environmental impact (such as space, power and cooling).

FIG. 1 relates to U.S. Pat. No. 5,513,135 to Dell et al., of common assignment herewith, and depicts an early synchronous memory module. The memory module depicted in FIG. 1 is a dual in-line memory module (DIMM). This module is composed of synchronous DRAMs 8, buffer devices 12, an optimized pinout, and an interconnect and capacitive decoupling method to facilitate high performance operation. The patent also describes the use of clock re-drive on the module, using such devices as phase-locked loops (PLLs).

FIG. 2 relates to U.S. Pat. No. 6,173,382 to Dell et al., of common assignment herewith, and depicts a computer system 210 which includes a synchronous memory module 220 that is directly (i.e. point-to-point) connected to a memory controller 214 via a bus 240, and which further includes logic circuitry 224 (such as an application specific integrated circuit, or "ASIC") that buffers, registers or otherwise acts on the address, data and control information that is received from the memory controller 214. The memory module 220 can be programmed to operate in a plurality of selectable or programmable modes by way of an independent bus, such as an inter-integrated circuit (I2C) control bus 234, either as part of the memory initialization process or during normal operation. When utilized in applications requiring more than a single memory module connected directly to a memory controller, the patent notes that the resulting stubs can be minimized through the use of field-effect transistor (FET) switches to electrically disconnect modules from the bus.

Relative to U.S. Pat. Nos. 5,513,135, 6,173,382 further demonstrates the capability of integrating all of the defined functions (address, command, data, presence detect, etc) into a single device. The integration of functions is a common industry practice that is enabled by technology improvements and, in this case, enables additional module density and/or functionality.

FIG. 3, from U.S. Pat. No. 6,510,100 to Grundon et al., of common assignment herewith, depicts a simplified diagram and description of a memory system 310 that includes up to four registered DIMMs 340 on a traditional multi-drop stub bus. The subsystem includes a memory controller 320, an external clock buffer 330, registered DIMMs 340, an address bus 350, a control bus 360 and a data bus 370 with terminators 395 on the address bus 350 and the data bus 370. Although only a single memory channel is shown in FIG. 3, systems produced with these modules often included more than one discrete memory channel from the memory controller, with each of the memory channels operated singly (when a single channel was populated with modules) or in parallel (when two or more channels where populated with modules) to achieve the desired system functionality and/or performance.

FIG. 4, from U.S. Pat. No. 6,587,912 to Bonella et al., depicts a synchronous memory module 410 and system structure in which the repeater hubs 420 include local re-drive of the address, command and data to the local memory devices 401 and 402 via buses 421 and 422; generation of a local clock (as described in other figures and the patent text); and the re-driving of the appropriate memory interface signals to the next module or component in the system via bus 400.

FIG. 5 depicts a contemporary system composed of an integrated processor chip 500, which contains one or more processor elements and an integrated memory controller 510. In the configuration depicted in FIG. 5, multiple independent cascade interconnected memory interface busses 506 are logically aggregated together to operate in unison to support a single independent access request at a higher bandwidth with data and error detection/correction information distributed or "striped" across the parallel busses and associated devices. The memory controller 510 attaches to four narrow/high speed point-to-point memory busses 506, with each bus 506 connecting one of the several unique memory controller interface channels to a cascade interconnect memory subsystem 503 (or memory module) which includes at least a hub device 504 and one or more memory devices 509. Some systems further enable operations when a subset of the memory busses 506 are populated with memory subsystems 503. In this case, the one or more populated memory busses 508 may operate in unison to support a single access request.

FIG. 6 depicts a memory structure with cascaded memory modules 503 and unidirectional busses 506. One of the functions provided by the hub devices 504 in the memory modules 503 in the cascade structure is a re-drive function to send signals on the unidirectional busses 506 to other memory modules 503 or to the memory controller 510. FIG. 6 includes the memory controller 510 and four memory modules 503, on each of two memory busses 506 (a downstream memory bus with 24 wires and an upstream memory bus with 25 wires), connected to the memory controller 510 in either a direct or cascaded manner. The memory module 503 next to the memory controller 510 is connected to the memory controller 510 in a direct manner. The other memory modules 503 are connected to the memory controller 510 in a cascaded manner. Although not shown in this figure, the memory controller 510 may be integrated in the processor 500 and may connect to more than one memory bus 506 as depicted in FIG. 5.

As described above, in many high-speed, high capacity memory applications, a memory interface device (MID), often in the form of a "buffer" or "hub device," is utilized as an interface between one or more high speed busses and one or more memory storage devices. In contemporary systems, the MID and/or memory device functionality can be verified or tested via one or more means. These testing means include, but are not limited to: the execution of normal memory read/writes (e.g. normal operation), the execution of MID or memory device test patterns/sequences under the direction of a memory controller, and the execution of hard-coded test patterns/sequences via internal BIST (built-in-self-test circuitry). Operation of available memory device BIST circuitry, however, requires that the memory device (e.g., DRAM) be initialized to an active state, which may not be possible in the presence of some initial MID faults.

Another challenge associated with the testing and fault determination in a complex, high speed memory system is the need to execute specific commands and command sequences in response to a specific system configuration (e.g. MID/memory device/speed/density) and/or a fault type. Testing may include the need to place the memory system and/or a specific memory subsystem (e.g. a memory module) into one or more specific states, often with the intent to create a "scope loop" condition such that an oscilloscope or network analyzer can be used to determine if signal integrity, timing or other out-of spec interface conditions exist that affect system operability.

High speed daisy-chained memory structures present additional difficulties, due to the need to train multiple interfaces (e.g. drivers, receivers, data capture circuitry, etc) between each driving and receiving device. In this case, a test environment and/or a scope loop may be desired such that one MID can be established as a local 'master' device for the purpose of communicating with other MIDs that are downstream. In this case, the 'master' device (which may be the first, second or 'nth' MID in the daisy chain structure) would be configured to drive and/or receive information on the one or more high speed link connections, and be able to instruct downstream devices to issue commands. In addition to other benefits, this operability would reduce the real-time demands on the memory controller, allowing the system to implement parallel operations.

With the continued integration of BIST operability in emerging devices, the need exists, in advanced high reliability memory systems, to verify the operability of the integrated BIST functions. To do so, it is necessary to test the failure detection and recovery mechanisms of the MID, memory array, or other BIST engine(s)/exerciser routines sourced from such devices as the memory controller or processor (MC/uP). In some cases, prior to and/or during BIST operation it may be required to overwrite valid data locations in the memory array(s) with invalid data. The exercisers/BIST engines would then be started and/or re-started to verify that the engines are able to detect locations with invalid data.

Known solutions to problems such as those listed above, generally involve hard coding test routines (which may include DRAM initialization sequences, as well as write and read operations) into the hub chip hardware state machines, and/or using an intelligent driver chip like the MC/uP, which is designed to communicate with the memory subsystem for the performance of these tasks. It is desirable to perform these tasks, in a situation-dependent manner, without the need for a processing device (e.g. an MC/uP) to directly control the operation, or in at least some instances, without the need to be connected to the MID at all.

BRIEF SUMMARY OF THE INVENTION

An exemplary embodiment includes a memory interface device (MID) intended for use in a cascade interconnect system and in communication with one or more memory devices. The MID includes a first connection to a high speed bus operating at a first data rate, a second connection to the high speed bus, an alternate communication means and logic. The first connection to the high speed bus includes receiver circuitry operating at the first data rate. The alternate communication means operates at a second data rate that is slower than the first data rate. The logic facilitates receiving commands via the first connection from the high speed bus operating at the first data rate and using a first command sequence. The logic also facilitates receiving the commands via the alternate communication means using a second command sequence which differs from the first command sequence in the speed in which the commands are transferred. The logic further facilitates processing the commands if the commands are directed to the MID and redriving the commands via the second connection onto the high speed bus.

Another exemplary embodiment includes a cascade interconnect system including a memory controller for generating commands, a high speed bus in communication with the memory controller; and one or more MIDs cascade interconnected with the memory controller via the high speed bus. At least one of the MIDs is in communication with one or more memory devices and includes a first connection to the high speed bus operating at a first data rate, a second connection to the high speed bus, an alternate communication means and logic. The first connection includes receiver circuitry operating at the first data rate. The alternate communication means operates at a second data rate that is slower than the first data rate. The logic facilitates receiving the commands via the first connection from the high speed bus operating at the first data rate and using a first command sequence. The logic also facilitates receiving the commands via the alternate communication means using a second command sequence which differs from the first command sequence in the speed in which the commands are transferred. The logic further facilitates processing the commands if the commands are directed to the MID and redriving the commands via the second connection onto the high peed bus.

A further exemplary embodiment includes a method for testing a cascade interconnect memory system having a memory controller and one or more MIDs cascade interconnected by a high-speed bus operating at a first data rate. Each MID includes receiver circuitry in communication with the high-speed bus and operating at the first data rate. At least one of the MIDs includes a connection to an alternate communication means operating at a second data rate that is slower than the first data rate. The method includes receiving information including data and instructions at a MID via the alternate communication means at the second data rate and in a second command sequence different from a first command sequence utilized by the high speed bus when it operates at the first data rate. One or more of an execute test signal and a test start bit are received at the MID. All or a subset of the data is transferred to the receiver circuitry, the all or a subset selected in response to the instructions and to the execute test signal. The data is processed at the receiver circuitry if the data includes commands directed to the MID.

BRIEF DESCRIPTION OF THE DRAWINGS

Referring now to the drawings wherein like elements are numbered alike in the several FIGURES:

FIGS. 10A and 10B depict exemplary downstream an upstream frame formats that may be implemented by an exemplary embodiment;

FIG. 14 depicts downstream frames that may be utilized by an exemplary "Write Slow Address/Data Buffer slow command operation; and FIG. 15 depicts downstream frames that may be utilized by an exemplary "Write SCOM Register from Slow Data Buffer" slow command operation.

DETAILED DESCRIPTION OF EXEMPLARY EMBODIMENTS

Figure 1:
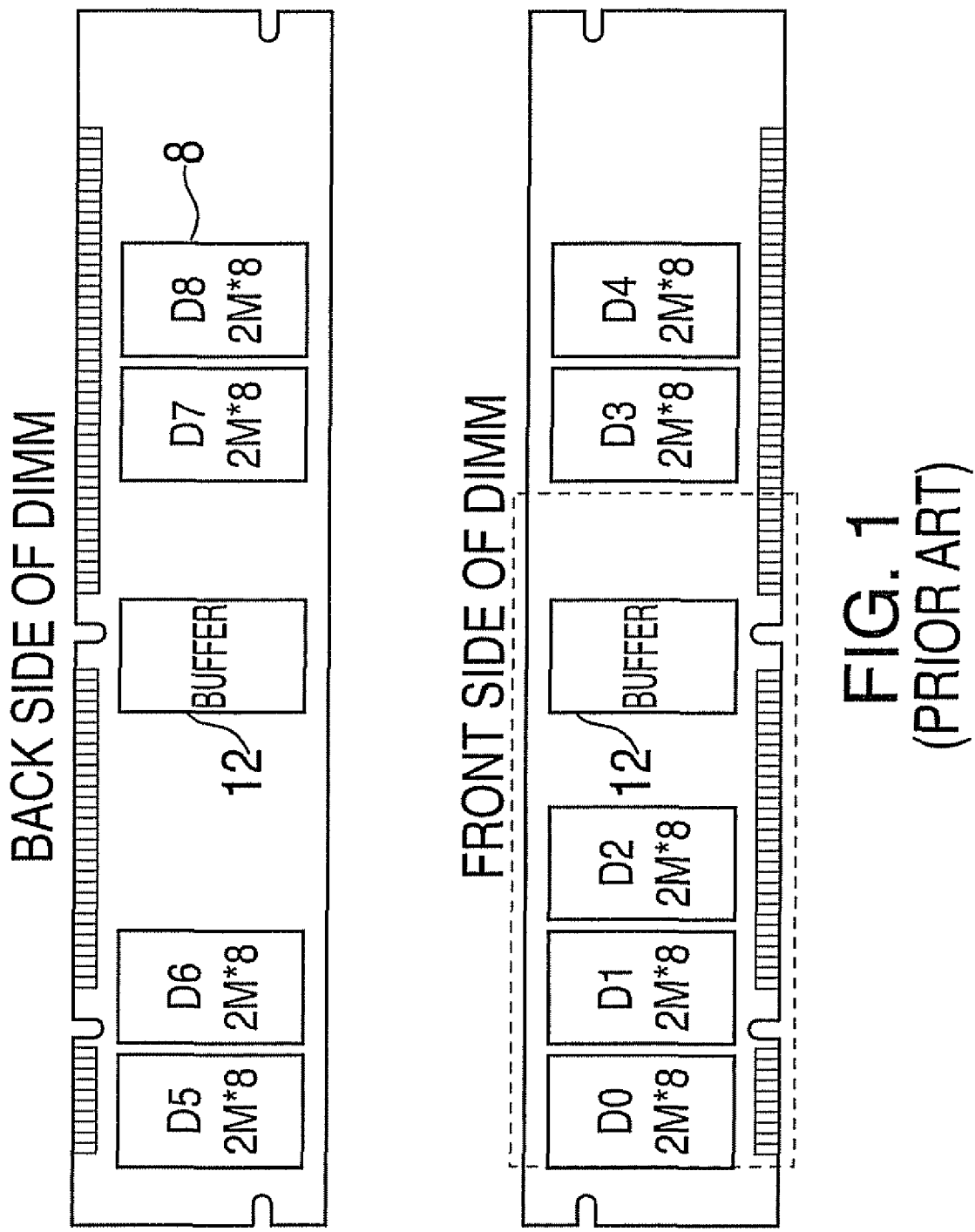
FIG. 1 depicts an early synchronous memory module.
Figure 2:
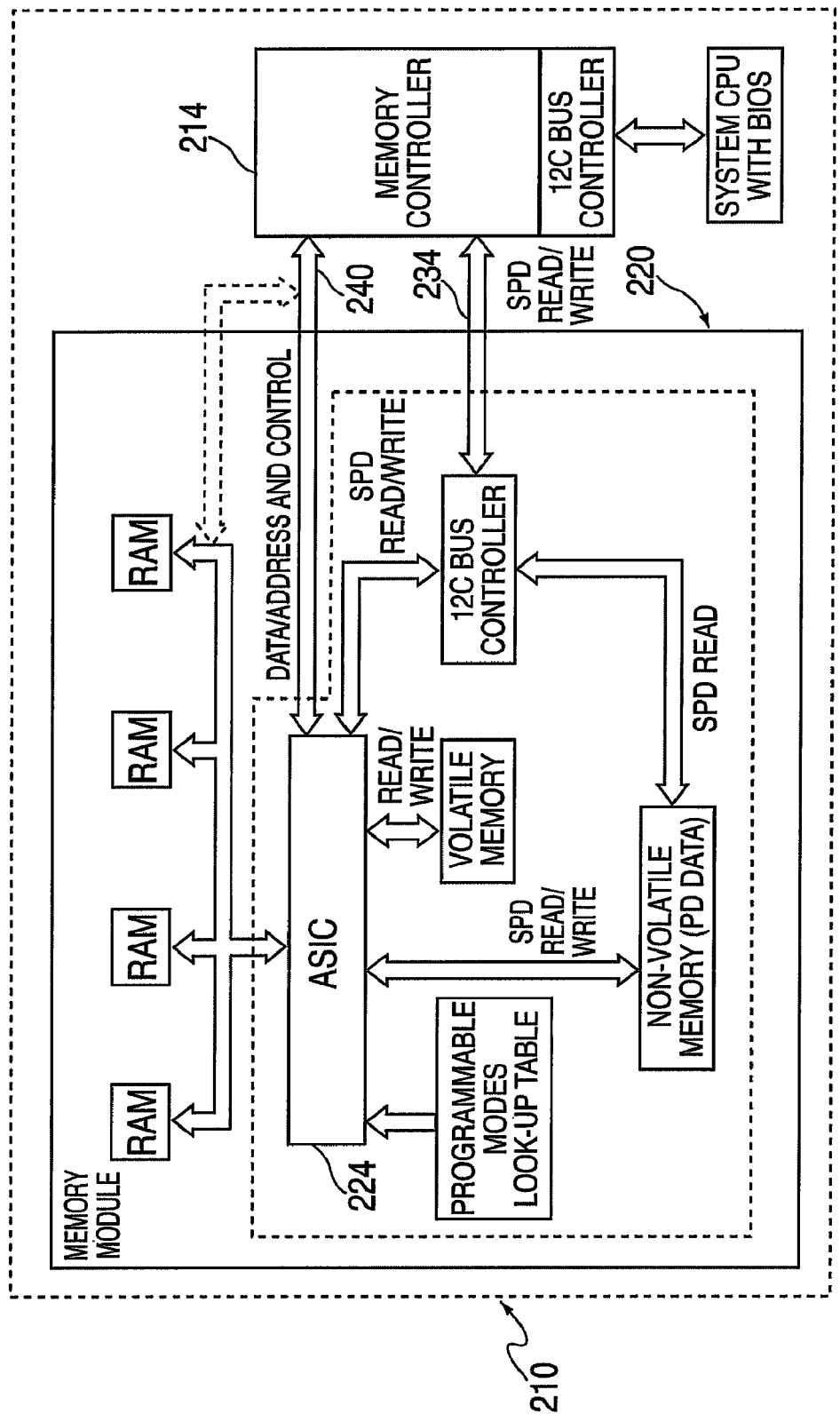
FIG. 2 depicts a computer system which includes a synchronous memory module that is directly connected to a memory controller.
Figure 3:
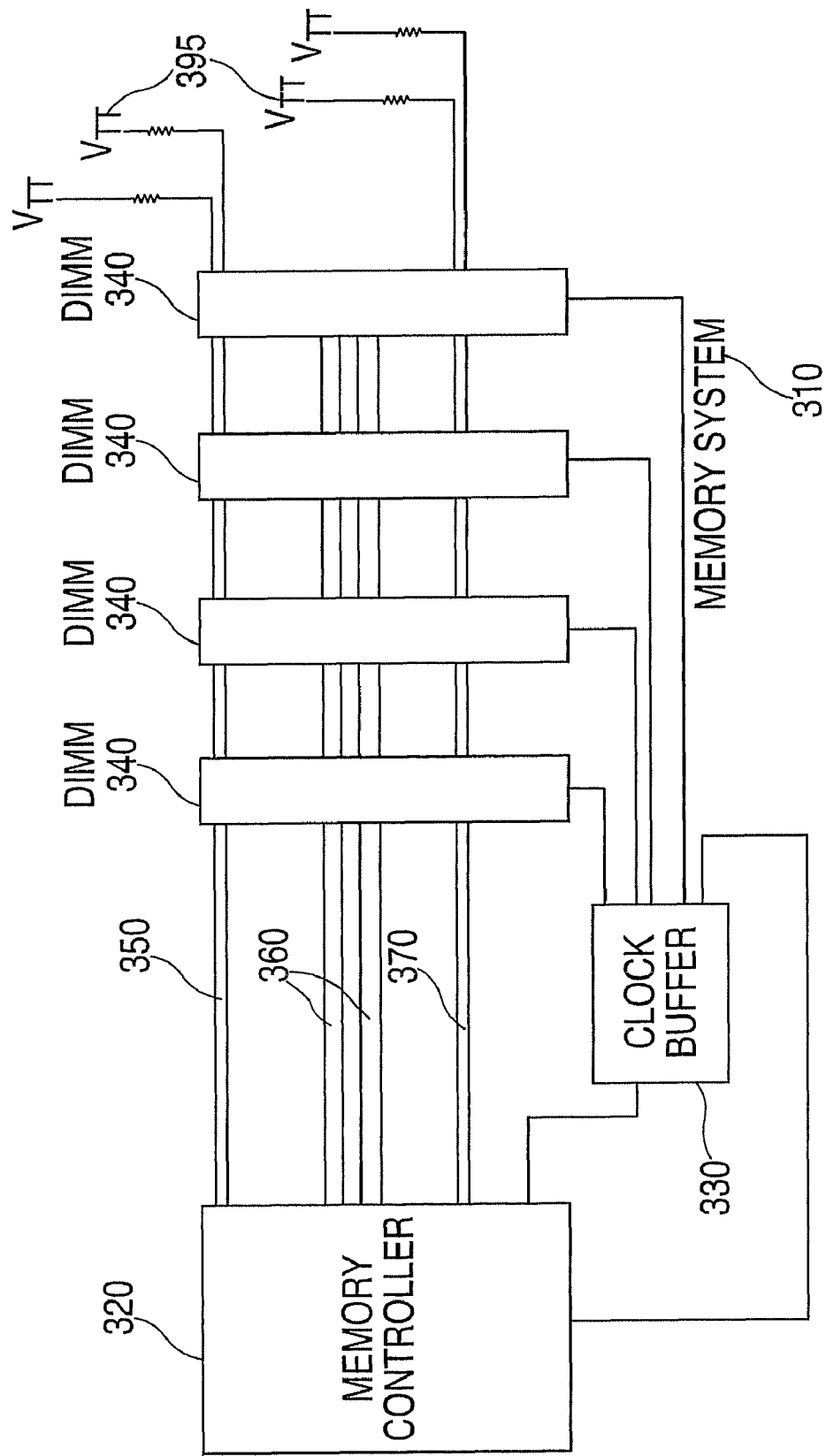
FIG. 3 depicts a memory system that includes DIMMs on a traditional multi-drop stub bus.
Figure 4:
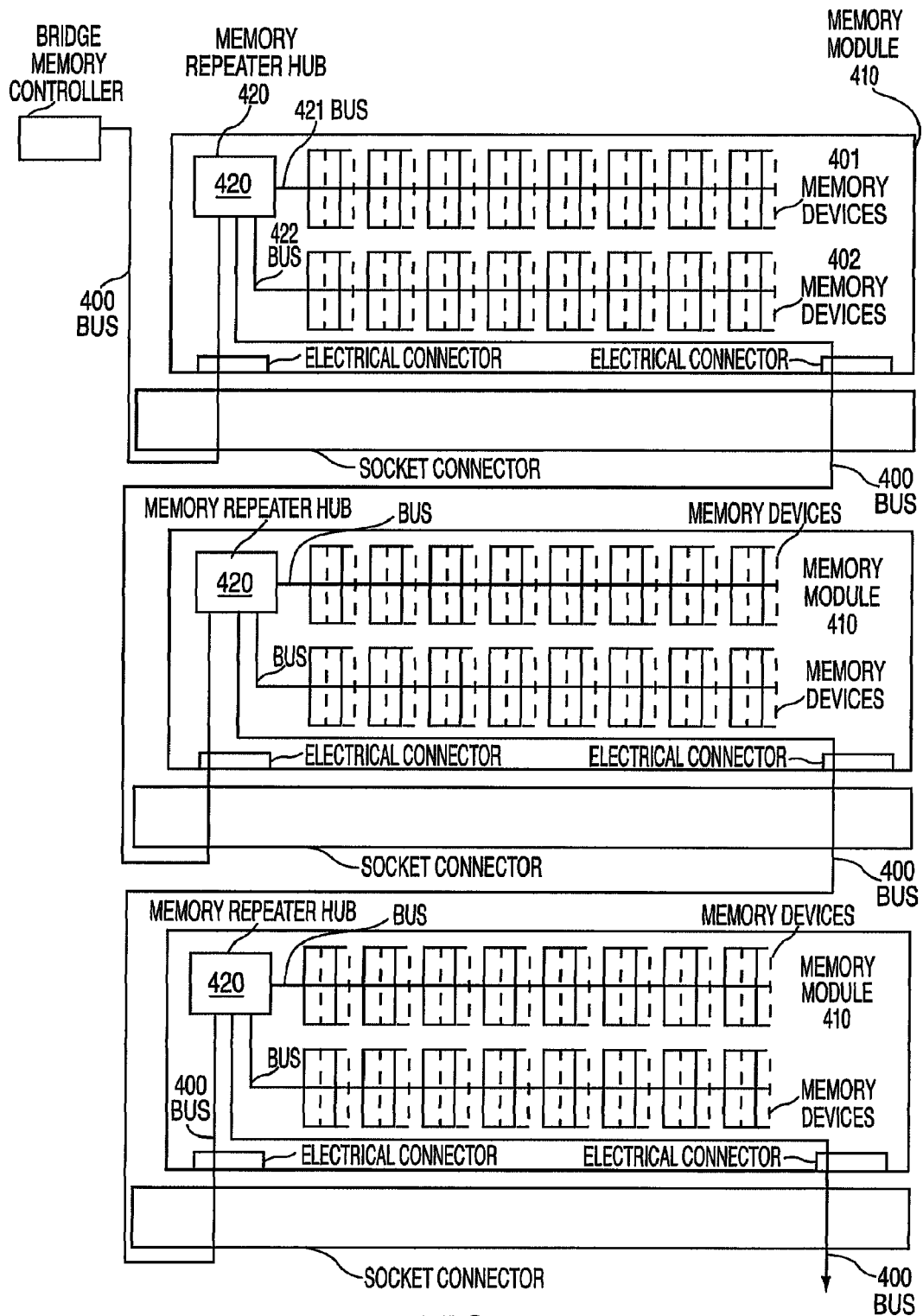
FIG. 4 depicts a synchronous memory module and system structure in which repeater hubs include local re-drive of address, command and data to the local memory devices.

An exemplary embodiment, referred to herein as configured command sequence (CCS) logic includes a programmable array of storage elements in a memory interface device (MID) to provide a method of executing commands that have been previously loaded into the array. An exemplary embodiment further uses a slow register access interface (e.g. significantly slower than the normal high speed upstream and downstream channels) to write commands and/or data into the storage elements. In an exemplary embodiment, all of the commands and data to be executed by the conventional MID circuitry are encoded exactly as if the information was received from a memory controller/microprocessor (MC/uP) over a high speed link(s); however the information is received using an alternate communication means, such as a serial interface (e.g. joint test action group or "JTAG", field service interface or "FSI" or similar interface); an untrained high speed link; or another means other than normal transfers over the high speed link(s) themselves, when operating at the intended speeds and using the standard downstream frame format(s). This alternate communication means is referred to herein as a slow register access interface or an alternate interface.

Since the conventional MID commands and data are transferred without modification, it is not necessary to include any unique encode/decode logic in the CCS logic. Once the CCS logic transfers the received frames to the receiver circuitry in the MID, the frames are merged onto the same internal MID busses that would have contained the information had it been received from the high-speed interface (e.g., high-speed bus or link). In an exemplary embodiment, the transfer of information from the CCS logic is completed in response to the receipt of maintenance commands, also received via an alternate interface (e.g. serial link, untrained high-speed link, or other link). Although the received frames are transferred without modification in the exemplary embodiment, other formats may be used in alternate exemplary embodiments, including such techniques as compression, encoding/decoding, encryption, etc, with the information then converted into the standard frame format (or other desired format) prior to transferring the information into the conventional MID bus receiver circuitry.

In an exemplary embodiment, the information sent over the alternate communication means (e.g. an FSI or JTAG serial interface, or an untrained high speed interface using slow commands) is transferred consistent with the communication protocol for the selected path. For example, in an exemplary JTAG implementation, serial transfers will consist of both instruction and data content, with the received information loaded into the instruction or data registers in a pervasive and miscellaneous logic block in the MID, which further contains the CCS logic, consistent with the JTAG protocol. Upon receipt of information over the JTAG interface, the information is transferred to SCOM (Scannable COMMunication) registers on the MID. These registers include instruction registers in a flow control block (FCB) command buffer for storing the instructions to provide FCB commands, and data registers in a frame buffer for storing the data content as command frames to be processed by the hub device. In an exemplary embodiment, these registers are shared with other functions used at different times, such as BIST error registers.

Figure 5:
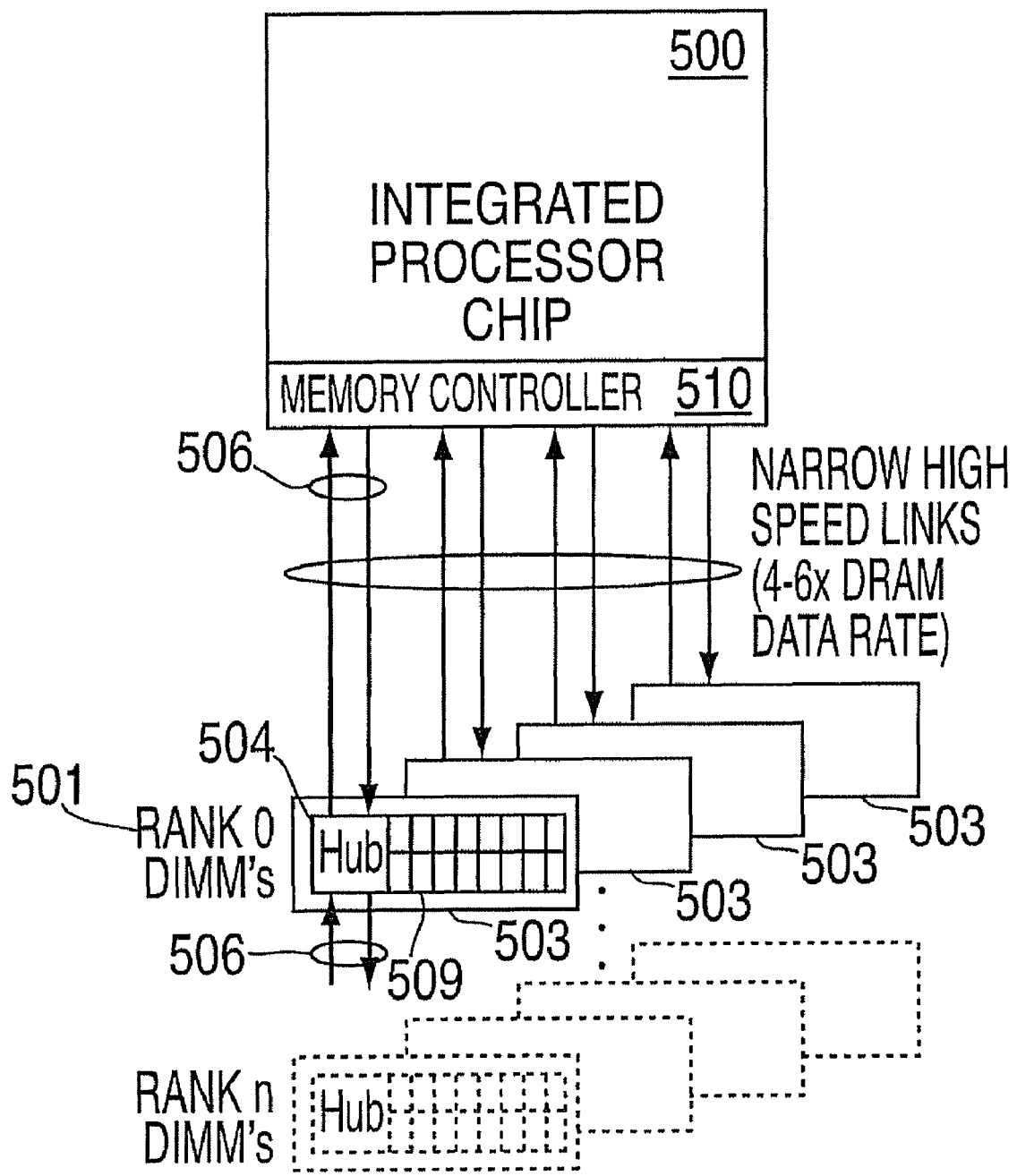
FIG. 5 depicts a cascade interconnect memory system with unidirectional busses.
Figure 6:
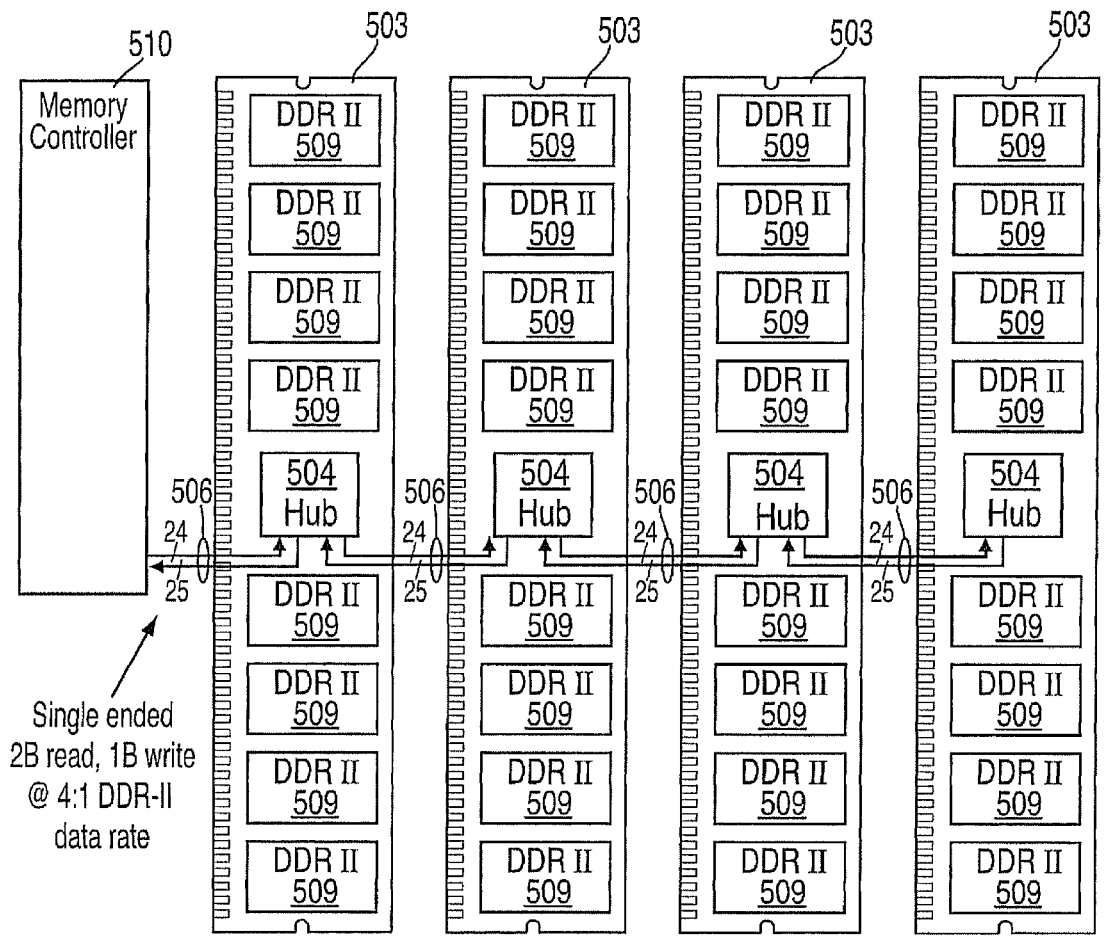
FIG. 6 depicts a cascade interconnect memory system with unidirectional busses.
Figure 7:
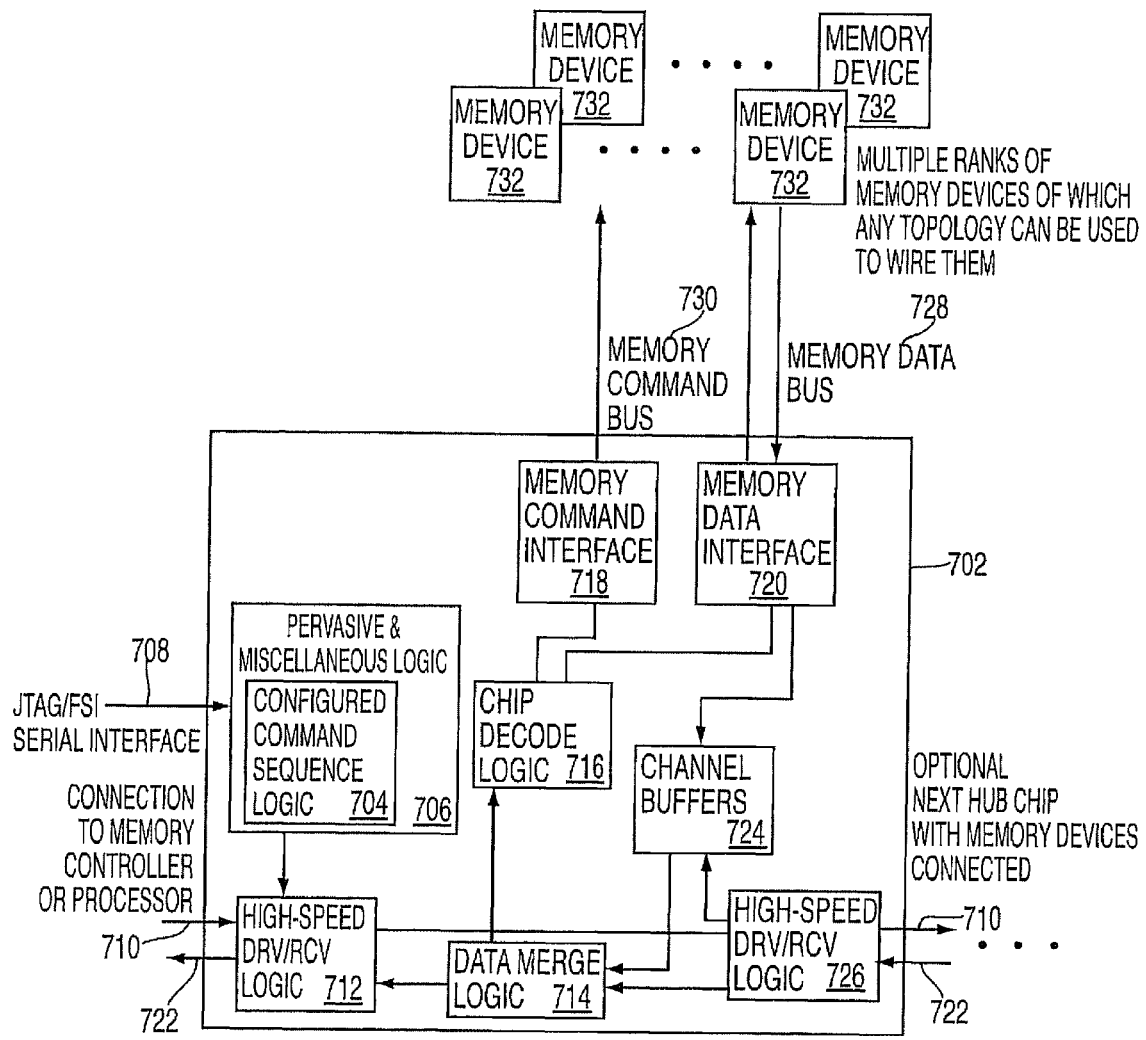
FIG. 7 is a block diagram of a hub chip with configured command sequence logic that may be implemented by an exemplary embodiment.

FIG. 7 is a high-level block diagram of a MID 702 (e.g., hub chip) with CCS logic 704 that may be implemented by an exemplary embodiment. In an exemplary embodiment, the memory system containing the hub device is configured in a manner similar to the cascade interconnect memory systems depicted in FIGS. 5 and 6, although other interconnect structures such as multi-drop, etc, may also be used. The blocks in the lower left and right portions of FIG. 7 (712, 726) are associated with receiving or driving the high-speed bus (made up of one or more upstream bus(ses) 722 and a downstream bus(ses) 710). The upstream bus 722 passes information in the direction of a memory controller or processor, and the downstream bus 710 passes information away from the memory controller or processor.

Referring to FIG. 7, data, command, address, ECC, and clock signals from an upstream memory assembly (e.g., a memory module 503) or a memory controller are received via the downstream memory bus 710 into high-speed driver/receiver logic 712. As used herein, the term "logic" refers to hardware circuitry and/or software instructions. The receiver logic in the high-speed driver/receiver logic 712 provides macros and support logic for the downstream memory bus 710 and, in an exemplary embodiment of the present invention, includes support for a twenty-two bit, high speed, slave receiver bus. The received signals (which may be changed/reordered in response to ECC/sparing functions) are input to high-speed driver/receiver logic 726 for transmission, via the downstream memory bus 710, to the next memory module in the chain. The high-speed driver/receiver logic 726 provides macros and support logic for the downstream memory bus 710 and in an exemplary embodiment, the twenty-two bit, high-speed, low-latency cascade bus drivers.

In addition to being transferred to the high-speed driver/receiver logic 726, the received signals are transferred to chip decode logic 716 and to the pervasive and miscellaneous logic 706.

The pervasive and miscellaneous logic 706 includes CCS logic 704 for carrying out the command sequencing processes described herein. See FIG. 8 for a depiction of exemplary contents of the CCS logic 704. In addition, the pervasive and miscellaneous logic 706 is utilized to determine if a command received over the high-speed link when it is in an untrained state is a slow command. In an exemplary embodiment (described below in reference to FIGS. 11-15, the untrained high-speed link is utilized as the alternate communication means (also referred to as the slow register access interface) to receive CCS instructions and data content.

The chip decode logic 716 determines if the received signals (including data, command and address signals) are directed to and should be processed by the memory module associated with the hub device receiving the received signals. If the received signals are directed to the memory module, and are not composed of "slow commands", then the chip decode logic 716 determines what actions to take and may initiate DRAM actions, write buffer actions, read buffer actions or a combination thereof. Depending on the type of memory module (buffered, unbuffered, registered), the chip decode logic 716 selects the appropriate drive characteristics, timings and timing relationships. The data signals are transmitted to a memory data interface 720 and the associated addresses and command signals are transmitted to a memory command interface 718, consistent with the specification for the memory module type (buffered, unbuffered, registered, etc.).

The memory command interface 718 includes programmable timing circuitry to enable memory device timings to be met whether the devices are directly attached to the hub, or attached indirectly via one or more modules connected to the hub/adapter assembly. Unbuffered memory modules, which do not include re-drive or address, control and/or command data, will generally be operated with timings similar to those of direct-attached memory devices; however drive strengths on the memory command interface 718 may be adjusted, as well as timing relationships between signals and/or signal groupings, based on the unbuffered module type (e.g. whether the Unbuffered DIMM is a conventional Unbuffered DIMM (e.g. a UDIMM), an SO DIMM (small outline DIMM), or other Unbuffered DIMM type, the memory device count, DIMM wiring topology, etc). Registered memory modules generally include re-drive of one or more of address, control and command signals, thereby generally requiring a lower drive strength from the memory command interface 718, but may require a shift in one or more of the address, control and command timings relative to data due to the re-drive delay on these one or more signals on the registered DIMM.

The memory command interface 718, therefore, includes one or more of additional programmable drive strength, terminations, programmable timings (signal output times relative to clock) and clock relationships (e.g. signals may be sent on different clock boundaries) such that a wide range of memory device attachment methods (directly and indirectly attached to the command interface) can be supported. The memory clocks are also forwarded to the attached memory devices and/or modules via clock pairs (e.g., 6 differential clock pairs or 12 wires) from the memory command interface 718. The memory commands are transmitted to the memory device(s) 732 via a command memory bus 730, which may also include the memory clocks, or these clocks may be sent via a separate bus structure (not shown).

Similarly, the memory data interface 720 reads from and writes memory data, via a memory one or more data bus(es) 728, to directly attached memory device(s) 732 and/or to one or more memory modules. As with the memory command interface 718, the memory data interface 720 includes one or more of programmable drive strength, terminations, programmable timings (signal output times relative to clock) and clock relationships (signals may be sent on different clock boundaries, relative to the clocks sourced from memory command interface 718) such that a wide range of memory device attachment methods (directly and indirectly attached to the command interface) can be supported. With the exemplary interface programmability included in the memory data interface 720 and memory command interface 718, the exemplary MID 702 (e.g., a hub device) offers a single device and/or package solution which can be used on a module as part of a memory subsystem, on an adapter card to connect to one or more attached memory modules, as an interface device (on a system board or card) to adapt a packetized, multi-transfer interface to an alternate parallel interface, such as a multi-drop, fly-by or other memory interface, etc.

Data signals to be transmitted to the memory controller may be temporarily stored in the channel buffers 724 after a command, such as a read command, has been executed by the memory module, consistent with the memory device 'read' timings. The channel buffers 724 transfer the read data into data merge logic 714 which merges the data on to the upstream memory bus 710 via the high-speed driver/receiver logic 712. The high-speed driver/receiver logic 712 transmits the signals (which may be changed/reordered in response to ECC/sparing functions during normal operation), via the upstream memory bus 722, to the next memory assembly (i.e., memory module) or memory controller in the chain. The high-speed driver/receiver logic 712 provides macros and support logic for the upstream memory bus 722 and, in an exemplary embodiment of the present invention, includes support for a twenty-three bit, high speed, low latency cascade driver bus.

Data, clock and ECC signals from the upstream memory bus 722 are also received by any upstream MID (e.g., a hub device) in any upstream memory module. These signals need to be passed upstream to the next memory module or to the memory controller. Referring to FIG. 7, data, ECC and clock signals from a downstream memory assembly (i.e., a memory module) are received on the upstream memory bus 722 into the high-speed driver/receiver logic 726. The high-speed driver/receiver logic 726 provides macros and support logic for the upstream memory bus 722 and, in an exemplary embodiment of the present invention includes support for a twenty-three bit, high speed, slave receiver bus. The receiver in the high-speed driver/receiver logic 726 passes the data and ECC signals, through the data merge logic 714. The signals are transmitted to the upstream memory bus 722 via the high-speed driver/receiver logic 712.

For simplicity and ease of description, the MID 702 depicted in FIG. 7 is not intended to depict every logic element that would be included in the MID 702. Other elements not depicted may be included such as, but not limited to, ECC logic and sparing logic.

The block diagram in FIG. 7 is one implementation of a MID 702 that may be utilized by exemplary embodiments of the present invention. Other implementations are possible without departing from the scope of the present invention. As used herein, the terms "high speed link", "high speed interface" and "high speed bus" are used interchangeably, and may refer to what may be construed as one or more busses in alternate exemplary embodiments.

Figure 8:
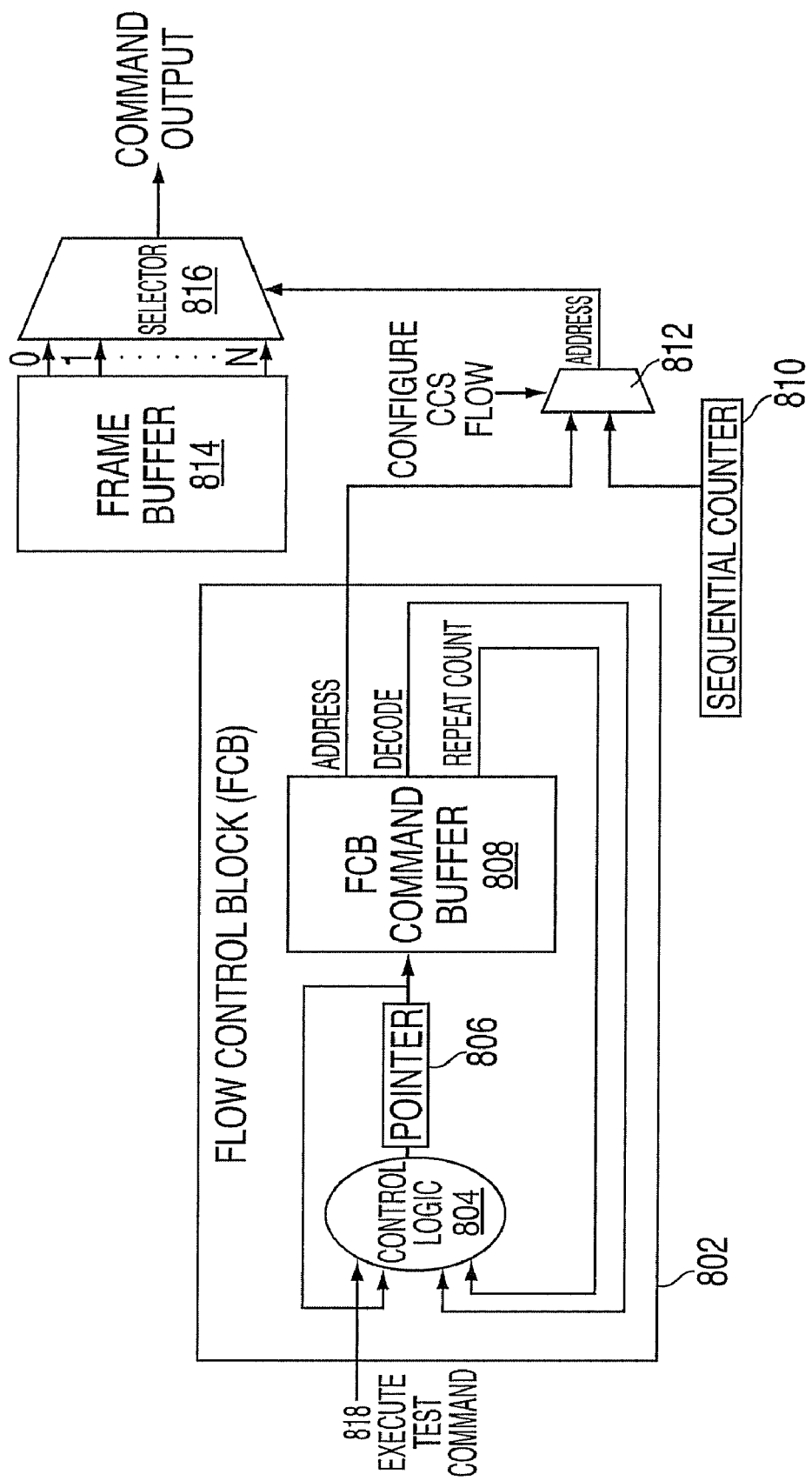
FIG. 8 is a block diagram of configured command sequence logic that may be implemented by an exemplary embodiment.

FIG. 8 is a block diagram of configured command sequence logic 704 in a MID that may be implemented by an exemplary embodiment. In an exemplary embodiment, up to eight frames of information are stored in a frame buffer 814

(which is made up of several data registers) in conjunction with information describing the FCB operation (e.g., special decodes, repeat count, etc.) stored in the FCB command buffer 808 (made up one or more instruction registers). As shown in FIG. 7, the up to eight frames of information in conjunction with FCB information, is received by the pervasive and miscellaneous block 706 containing the CCS block 704, via one or more of the interface to the high speed driver/receiver logic 712 (wherein "slow commands" can be provided) and/or a serial interface such as a JTAG or FSI interface 708. Upon receipt of a command to execute the CCS logic 704 (generally via a command received by the FCB Command Buffer 808, although alternately via a received command such as an "execute test command" 818), the one or more frames in the frame buffer 814 are passed to the MID receiver logic located in the high-speed driver/receiver logic 712 in an exemplary embodiment, under the control of the FCB 802. In the exemplary embodiment, the information transferred to high speed driver/receiver logic 712 is at the same speed and format as data received over the high speed link 710, thereby allowing the hub device 702 to process the received information in the normal manner (e.g., depending on the command decode by the chip decode logic 716, transfers may be initiated from the memory command interface 718 and memory data interface 720 to the attached one or more memory devices, BIST operations may be initiated in the MID and/or memory devices, the one or more frames of data may be transferred over the downstream bus 710 or another high speed link, etc.).

As indicated earlier, transfer of the received frames and subsequent execution of the included commands is initiated upon receipt of a command to execute the CCS logic 704. In an exemplary embodiment, an "execute test command" signal 818 in FIG. 8 initiates control logic 804 to begin execution of commands stored in FCB command buffer 808. In another exemplary embodiment, upon filling the FCB command buffer 808 with a full complement of commands and/or idle operations, the execution of the stored commands begins as information, generally starting with the first command position (based on the pointer 806 being in a reset condition) is passed from FCB Command Buffer 808 to Control Logic 804. In an exemplary embodiment, the execute test command 818 is implemented by a "maintenance command", which comprises one of the valid commands that may be transferred to the FCB 802 by such means as setting a specified SCOM register bit—also accessible, as previously noted, via the JTAG, FSI and/or slow command decode interface, via the serial interface loop within the hub device. A "maintenance command" simply refers to another set of defined commands, which generally apply to non-conventional operation of the hub device (e.g. prior to normal operation, such as during interface alignment (LAP), built-in-self-test (BIST), and/or other diagnostic or test operations. As indicated previously, in an exemplary embodiment, once the up to eight complete downstream frames have been received in the SCOM registers (e.g., also referred to as the data registers in the frame buffer 814), the frames are automatically processed and cascaded onto the receiver in the high-speed driver/receiver logic 712 as if they were received from the high-speed bus. Although an exemplary embodiment allows up to eight frames, other exemplary embodiments will allow up to "n" frames, depending on the application requirements and available register storage.

In an alternate exemplary embodiment, the stored frames in the frame buffer 814 are executed in a sequential manner, based on a count provided by a sequential counter 810, rather than under the direction of the FCB Buffer 808 in conjunction with control logic 804 and pointer 806. This method is selected via the configure CCS flow input to multiplexer 812. The wide range of options for operating the hub device, in a near-normal manner, prior to the training of the high speed interfaces and/or the availability of a memory controller or processing device, provide tremendous flexibility to allow the hub operation to be initiated and monitored through the use of such means as the serial interfaces (e.g. JTAG and/or FSI), slow command decodes or other similar means that enable internal registers to be set (e.g. SCOM registers) at one speed, then operation of the hub device to be completed, for at least brief intervals, at normal and/or near-normal speeds, based on the desired use.

Once the up to eight frames begin execution (e.g. are passed to the receiver in the high-speed driver/receiver logic 712), the MID 702 starts decoding the commands/data from the CCS logic 704 and ignores incoming commands from the high-speed link. The CCS logic 704 sends commands from the frame buffer 814 onto the same bus logic that decodes commands from the MC/uP and also on to the downstream memory bus 710 to the next MID in the cascade (if any). In so doing, if the high speed link 710 is functional between current hub 702 and a downstream hub 702 (e.g. after bus calibration (e.g. IAP), in the presence of an upstream fault making that bus unusable, when a controller is not present, etc), operation of the downstream link, the downstream hub(s) as well as the upstream link to the current hub (if calibrated and functional) can also be operated and/or tested. In addition to executing the stored frames, in the exemplary embodiment, anywhere from 0-63 idle frames may be specified by the FCB 802 to be inserted after each of the CCS frames. Although not shown the broad range of hub commands include at least one command defined as an "idle" or "NOP" (no operation) command, in which no action is taken by the hub (e.g. no information is sent to the memory devices, and the hub device retains it current state, other than perhaps the incrementing of counters), although in an exemplary embodiment, the same "idle" command decode may be sent on the upstream link to an upstream hub device.

In an exemplary embodiment, the FCB 802 resides in the CCS logic 704 in the pervasive and miscellaneous logic 706 on the MID 702. The FCB 802, via the FCB control logic 804, controls the movement of data between the registers (e.g., the data register and instruction register) and other blocks in the MID 702. In an exemplary embodiment, the received frames are passed from the CCS logic 704 to the MID high-speed driver receiver logic 712 under the control of the FCB 802, which also resides in the pervasive and miscellaneous logic 706. The FCB 802 controls the CCS function, enabling flexibility in the command execution sequence, by identifying the frame (command) to be passed to the conventional MID logic flow at each step. As such, the FCB 802 contains the functionality of spacing and sequencing the "n" commands (frames) in a predefined and/or programmable order, consistent with FCB operational information stored in the FCB command buffer 808, generally received as part of the transfers received over the alternate communication means. The following is an example of a sequence of instructions (e.g., CCS commands) located in the FCB command buffer 808 to be executed under the control of the FCB 802.

| Step | Special Decode | Command Number to Execute | Repeat Count |
|---|---|---|---|
| 1 | None | Command Number 1 | No repeat |
| 2 | None | Command Number 2 | repeat count of 64 |

-continued

| Step | Special Decode | Command Number to Execute | Repeat Count |
|---|---|---|---|
| ... | | | |
| ... | | | |
| N – 1 | None | Command Number n – 1 | No repeat |
| N | CCS_END | NA | NA |

In addition, other special decodes are available which can be used, including:

| | | | |
|---|---|---|---|
| X | CCS_GOTO | New Execution Pointer | Repeat Count |

When the CCS above is executed (e.g. upon receipt of an execute test command such as a maintenance command or other means previously described), the FCB execution pointer 806 points to step 1 (row 1 of the above sequence), where execution will begin. In an exemplary embodiment, the maintenance command starts the execution when it has a defined "valid" bit set to a "1" or when a register write to a defined register valid bit occurs. The command number column describes the specific command (e.g. frame) to be transferred from the frame buffer 814 (command buffer) to the input receiver block 712, for subsequent execution in block 716 (command decode logic). The repeat count is used to determine how many times the command should be sent out prior to incrementing to the next step. The latter is useful in diagnostic and/or pre-conditioning operations.

The FCB 802 supports some special decodes that may be used in exemplary embodiments. These decodes include but are not limited to: CCS_END and CCS_GOTO. The CCS_END decode tells the CCS logic 704 to stop sending commands to the high speed driver/receiver logic block 712 (and on to chip decode logic 716). There is no repeat count information necessary with the CCS_END decode. The CCS_GOTO command decode changes the value of the execution pointer 806 to the value specified by a new execution pointer. In exemplary embodiments, this can be used to create a scope-loop (a repeating/consistent signal sequence(s) to facilitate determination, via such test equipment as an oscilloscope, of the operation of the device(s) given that sequence). In the exemplary embodiment, the CCS_GOTO decode uses the repeat count field in a special way. A repeat count of 0 means loop infinitely while any other repeat count means that the CCS_GOTO command will be executed the programmed number of times before the CCS_GOTO command becomes invalid and the command is ignored and the execution pointer continues to the next command in the FCB 802.

Figure 9:
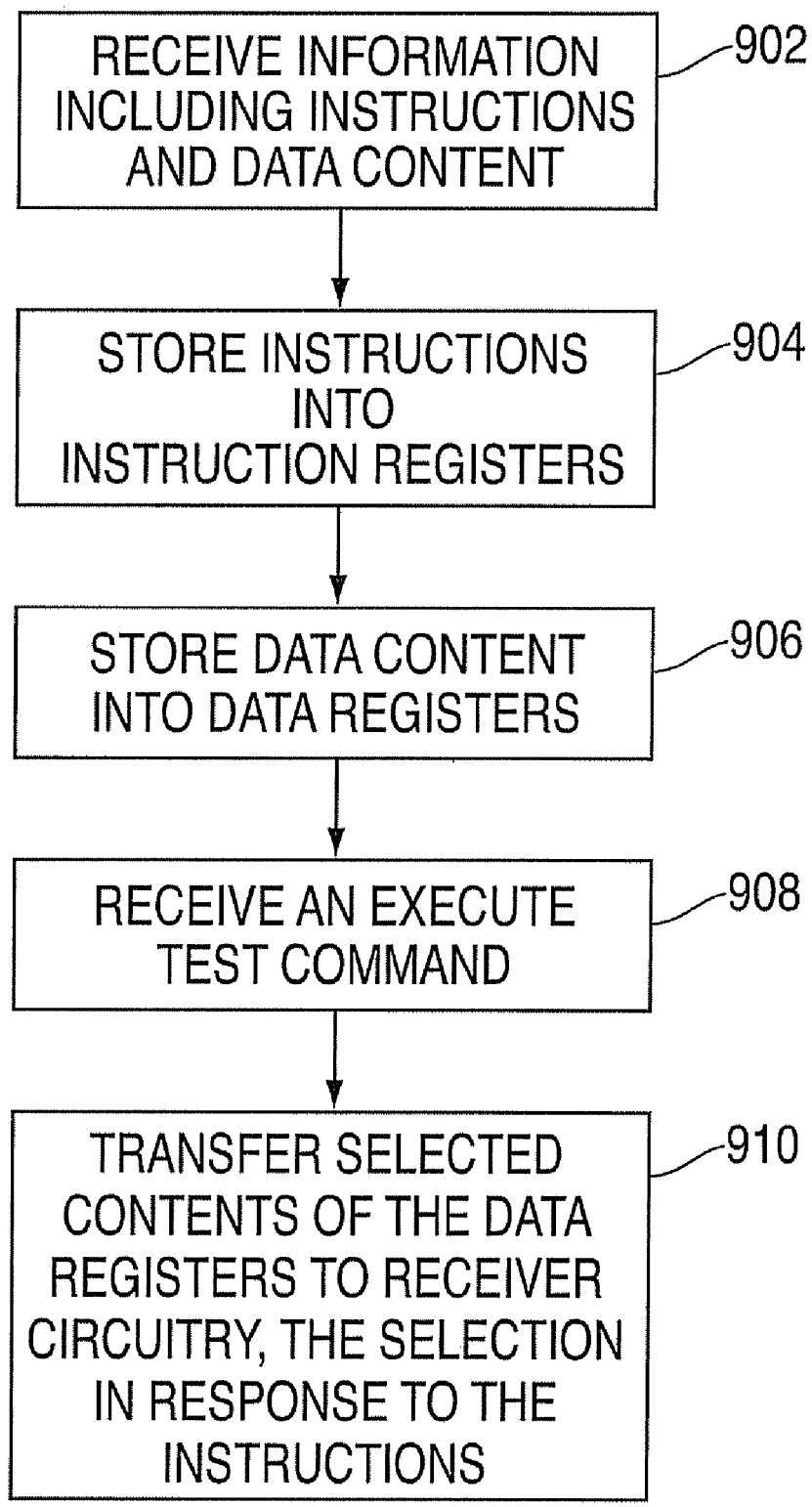
FIG. 9 is a process flow that may be facilitated by an exemplary embodiment of the configured command sequence logic.

FIG. 9 depicts a process flow that is implemented by the configured command sequence logic in an exemplary embodiment. At block 902, information, including instructions and data content is received at a MID (e.g., a hub device) via an alternate communication means (e.g. a serial interface, an untrained high-speed interface, etc). As described previously, the information received can be identified as either instructions or data content. This distinction between an instructions and data content can be made in any manner known in the art, such as a particular sub-section within a bit field/word, the placement of the information in a sequence of information (e.g. first, last, etc), the receipt of the information over separate line(s), consistency with known/defined protocols (such as JTAG), etc. Once the information content is known (e.g., address or data), the information is directed to the appropriate registers (e.g. the SAB (slow address buffer) or SDB (slow data buffer) when using the slow command decode communication means). In the latter example, once the SAB and SDB registers are loaded, the SDB contents are sent to the register addresses defined by the SAB—which in the exemplary case, would include the frame buffer 814 and the FCB command buffer 808. Many other methods may be used to load appropriate registers, while still retaining the intent of these teachings. In an exemplary embodiment the information is received by the CCS logic 706 in the pervasive and miscellaneous logic 706. At block 904 the CCS logic 706 stores the instruction(s) into an instruction register(s) in the FCB command buffer 808, and at block 906 the CCS logic stores the data content into a data register(s) in the frame buffer 814.

At block 908, the FCB 802 receives an execute test command 818 (e.g., a maintenance command via the alternate interface) or alternate "start" decode or bit as previously described, which initiates the execution of the commands stored in the FCB Command Buffer 808. At block 910, selected frames from the frame buffer 814, under the direction of blocks 808, 806, 804 and/or 810 and 812, are transferred to the high-speed driver/receiver logic 712 via selector 816. The frames are selected based on the contents of the FCB command buffer 808 or in a sequential manner. Once the full complement of information is transferred to the high speed driver/receiver logic 712, or as the information is forwarded to the high speed driver/receiver logic 712 in a manner consistent with receipt of the information over a normally operating high speed link 710, the commands stored passed to the high speed driver/receiver logic block 712 are processed by the MID 702 as if they are received from the downstream bus 710.

As described above, in the exemplary embodiment, the information stored in the frame buffer 814 and sent to the high-speed driver/receiver logic 712, are in the same format as frames received over the regular high-speed interface (e.g., the downstream bus 710). FIG. 10A depicts an exemplary downstream frame format (or packet format) that may be utilized by a memory system to transfer information downstream from a memory controller to one or more memory modules in a packetized manner via the high-speed interface. The downstream frame consists of eight transfers, with each transfer including twenty-two signals and a differential clock (twenty-four wires total). The frame includes eight command wires (c0 through c7) 1008, nine data wires (di0 through di8) 1006, four bus ECC (Error Correcting Code) wires (ecc0 through ecc3) 1004 and a spare wire (spare) 1002. The seventy-two data bits are shown in FIG. 10A as bits di0 through di8 include nine wires with eight transfers on each wire for each frame. The numbering of each data bit, as well as for other bits, is based on the wire used as well as the specific transfer. D34 refers to data bit 3 (of bits 0 through 8) and transfer 4 (of transfer 0 through 7). The command bit field is shown as c0 through c7, and consists of sixty-four bits of information provided to the module over eight transfers. The ECC bit field (ecc0 through ecc3) consists of thirty-two bit positions over eight transfers, but is actually formatted in groups of sixteen bits. Each sixteen bit packet consists of four transfers over each of the four wires, and provide the bus level fault detection and correction across each group of 4 bus transfers. The spare bit position may be used to logically replace any of the twenty-one wires, also defined as bitlanes, used to transfer bits in the command, data and ECC fields, should a failure occur in one of those bitlanes that results in errors that exceed a system-assigned failure threshold limit.

Using this exemplary embodiment of the present invention depicted in FIG. 10A, provides that out of the one hundred and seventy-six possible bit positions, one hundred and sixty-eight are available for the transfer of information to the memory module, and of those one hundred and sixty-eight bit positions, thirty-two bit positions are further assigned to providing ECC protection on the bus transfers themselves, thereby allowing a total of one hundred and thirty-six bit positions to be used for the transfer of information to the memory module. The frame format depicted in FIG. 10A is meant to be an example, as other frame formats may also be utilized depending, for example, on the type of information being transferred. In addition, one or both of the command and data signals (or bits) may contain address signals (or bits).

In the exemplary embodiment, especially as applied to operation prior to the training of the high speed link(s), a portion of the downstream frame(s) may not be used, as these are not required for basic operation. In such an embodiment, the spare bit lane 1002 and ECC check bit lanes 1004 would not be used when operating in at least a subset of the modes other than the normal operating modes. In the exemplary embodiment previously described, downstream fields associated with "write data bits" 1006 and "command bits" 1008 would be used—further conserving register space in the CCS block 706.

FIG. 10B depicts an exemplary upstream frame format (or packet format) that may be utilized by a memory system to transfer information upstream to an upstream memory module and/or to the memory controller in a packetized manner. The upstream frame consists of eight transfers, with each transfer including twenty-three signals and a differential clock (twenty-five wires total). The frame includes eighteen data wires (do0 through do17) 1014, four bus ECC wires (ecc0 through ecc3) 1012 and a spare wire (spare) 1010. The data bit field is shown as do0 through do17, and consists of 18 wires with eight transfers on each wire for each frame. The numbering of each data bit, as well as for other bits, is based on the wire used as well as the specific transfer. D84 refers to data bit 8 (of bits 0 through 17) and transfer 4 (of transfer 0 through 7). The ECC bit field (ecc0 through ecc3) consists of thirty-two bit positions over eight transfers, but is actually formatted in groups of sixteen bits. Each sixteen bit packet consists of four transfers over each of the four wires, and provide the bus level fault detection and correction across each group of 4 bus transfers. The spare bit position may be used to logically replace any of the twenty-two wires, also defined as bitlanes, used to transfer bits in the data and ECC fields, should a failure occur in one of those bitlanes that results in errors that exceed a system-assigned failure threshold limit.

Using this exemplary embodiment of the present invention depicted in 10B, provides that out of the one hundred and eighty-four bit positions, one hundred and seventy-six are available for the transfer of information to the memory module, and of those one hundred and seventy-six bit positions, thirty-two bit positions are further assigned to providing ECC protection on the bus transfers themselves, thereby allowing a total of one hundred and forty-four bit positions to be used for the transfer of information to the memory module. The frame format depicted in FIG. 10B is meant to be an example, as other frame formats may also be utilized depending, for example, on the type of information being transferred.

As with the downstream frame format discussed earlier in FIG. 10A, in the exemplary embodiment, especially as applied to operation prior to the training of the high speed link(s), a portion of the upstream frame(s) may not be used—as these are not required for basic operation. In such an embodiment, the spare bit lane 1010 and ECC check bit lanes 1012 would not be used when operating in at least a subset of the modes other than the normal operating modes. In the exemplary embodiment previously described, upstream fields associated with "Read data bits" 1014 would be used—further conserving register space in the CCS block 706.

Figure 11:
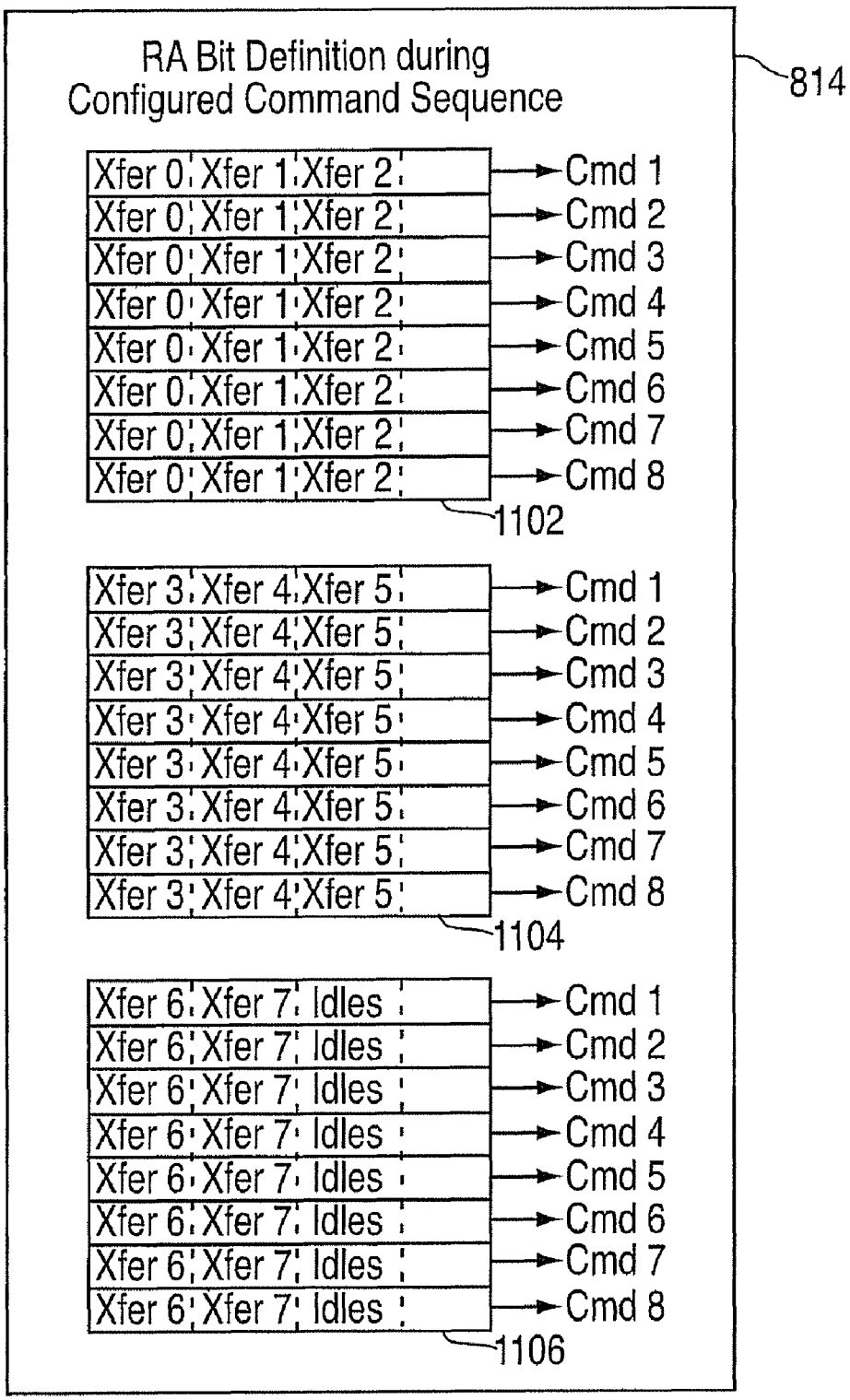
FIG. 11 depicts an exemplary data register array arrangement that may be implemented by an exemplary embodiment.

FIG. 11 depicts an exemplary data register array arrangement stored in the frame buffer 814 that may be implemented by an exemplary embodiment. The frame buffer 814 depicted in FIG. 11 includes three sixty-four bit register arrays, register array one 1102, register array two 1104 and register array three 1106. Complete frames are made up of transfers from corresponding rows in the three register arrays, with thirteen unused bits at the end of each row in the registers in the exemplary embodiment (other embodiments may have more, less or no unused bits, depending on the register size and frame format). For example, a complete frame of eight downstream transfers is made up the first rows of register array one 1102, register array two 1104 and register array three 1106; and another complete frame of eight transfers is made up the second rows of register array one 1102, register array two 1104 and register array three 1106. In an exemplary embodiment the format of the frame is the same as those depicted in FIGS. 10A and 10B, with the "spare" and ECC bit positions unused, and thereby not included in the register arrays, as discussed previously. As such, with the "write data bit" 1006 and "command bit" 1008 portions of the downstream frame comprising 17 bits in each of the 24 bit transfers shown in FIG. 10A, it is readily apparent that three 17 bit transfers+thirteen unused bits ((3×17)+13)=64 bits, which is the size of the exemplary register described earlier.

In an alternate exemplary embodiment, the frames received on the alternate port (e.g. FSI, JTAG or slow commands) may be used to create upstream frames such as those sent from an upstream hub, intended for delivery to the controller. Using this method, it is possible to test the upstream channel, without the need of first executing a valid downstream operation (e.g. a memory "read" command) which results in a read response in the form of an upstream frame. In addition, this method permits loops to be created wherein a fixed or unlimited number of upstream frames are initiated, to aid in characterization or debug, without the need of having an operational downstream bus, or a memory controller, or even a processor attached.

FIGS. 12-15 depict an alternate exemplary embodiment, where an untrained high-speed link is utilized as the alternate communication means. When the frame(s) are received by the CCS logic 704 via slow commands on the high speed link, the commands are processed in a manner consistent with the process described in co-pending application entitled "System for Providing a Slow Command Decode Over an Untrained High-Speed Interface" filed on the same date as the present application by inventors C. Yung, and K. Gower and incorporated herein by reference in its entirety. Once the information is transferred to the SCOM registers (i.e., the instruction register(s) in the FCB command buffer 808 and the data register(s) in the frame buffer 814), and a command to execute the test occurs, then execution occurs identical to that of the FSI/JTAG serial interface implementation described above.

As used herein the term "untrained high speed interface" refers to one or more busses which normally operate over a given frequency range (e.g. 3.2 Gb/s, 4.8 Gb/s or higher), but are incapable of sending and/or receiving information in an understandable manner at the otherwise normal speeds indicated until one or more of drive strength, receiver capture timings and bus terminations are properly calibrated for the then current environmental conditions. As used herein the term "first data rate" refers to the speed of the high speed interface when it has been trained and operating (for example)

at the above given frequency range and the term "second data rate" refers to the speed of the alternate communication path (e.g., a JTAG or FSI or the high speed interface in an untrained state) which is slower than the speed of the first data rate. In addition, the terms "first command sequence" refers to the command sequence of commands transferred over the high speed interface when it has been trained and is operating (for example) at the above given frequency range, and the term "second command sequence" refers to the command sequence of commands transferred over the alternate communication path. In an exemplary embodiment described herein, the second command sequence is in a format that is similar to the first command sequence, but differs in that it requires more transfers to communicate each command.

Figure 12:
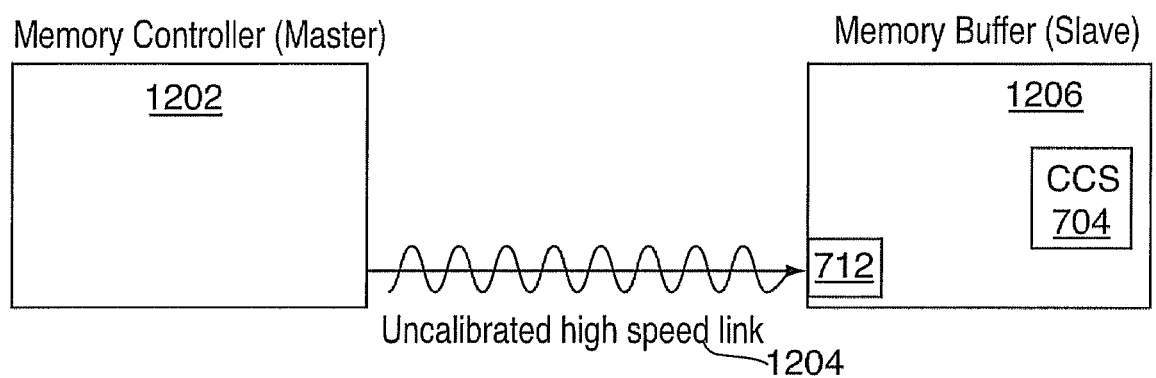
FIG. 12 is a block diagram of an exemplary memory system that may be implemented by an exemplary embodiment.

FIG. 12 depicts a high level block diagram of an exemplary memory system that may be implemented by an exemplary embodiment of the present invention to receive CCS instructions and data over an untrained high speed interface. The exemplary memory system includes a memory controller 1202 (master), connected to a memory buffer or hub device 1206 (slave) via one or more high-speed interfaces 1204 which require training (e.g. the execution of an interface alignment procedure (IAP)) prior to conventional operation. Although not shown, exemplary embodiments may include a cascade interconnect port on memory buffer 1206, permitting connection to another downstream buffer 1206. In FIG. 12, the CCS commands are transferred to a MID (e.g., hub device 1206) through the use of slow command decodes which are sent from the memory controller 1202 to the memory hub device 1206 on the one or more un-calibrated high speed interface(s) 1204 (also referred to herein as busses and/or links).

Figure 13:
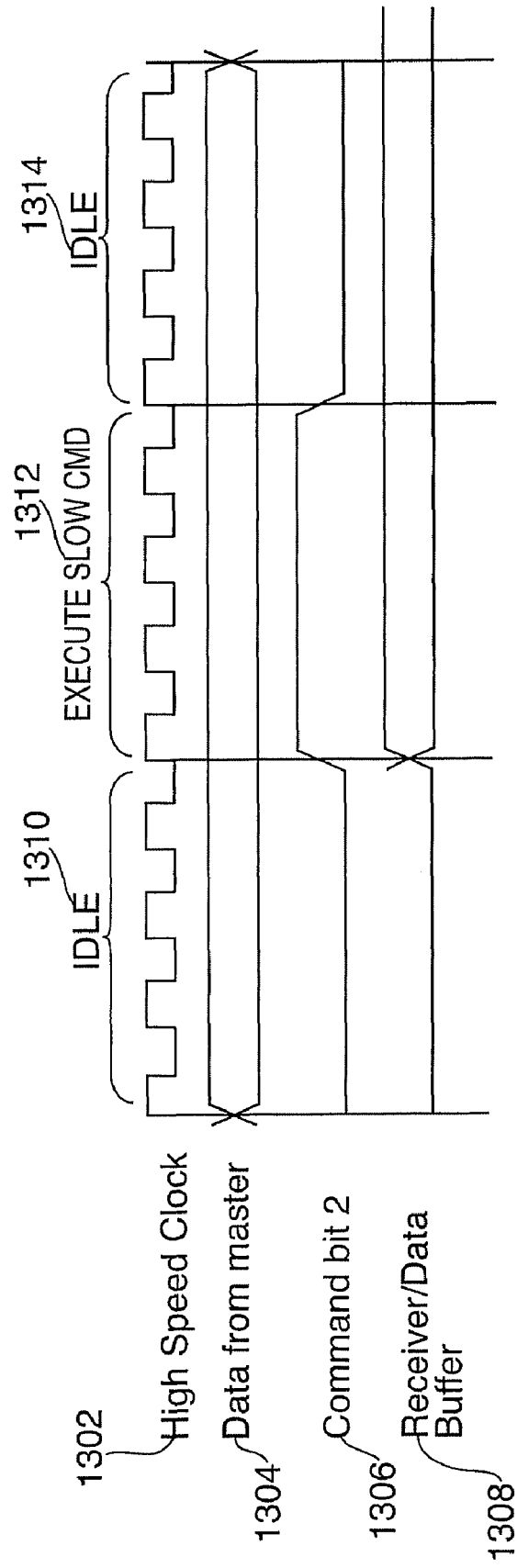
FIG. 13 depicts a simplified timing diagram of a slow command decode that may be implemented by an exemplary embodiment.

FIG. 13 depicts a simplified timing diagram example of a slow command decode, of the present invention, which is generally intended for use prior to normal, high speed bus operational capability (e.g. high speed bus training). During the slow command decode operation, the exemplary sequence identifying a "slow command" is 8 or more transfers (e.g., four clock cycles of the high speed clock 1302) in which an "IDLE" command is present on the bus 1310 (command bits 0-2 (0:2) are at a "0 0 0" state (low level)), followed by 8 transfers where command bits 0-2 (0:2) are at a "0 0 1" state 1312 (e.g., command bit 2 1306 is a high level, and command bits 0 and 1 are at a low level), followed by 8 or transfers in which an "IDLE" command is again present on the bus 1314. In an exemplary embodiment, the slave device (e.g. the hub or buffer device 1206) uses the bit change on command bit 2 (e.g. from a "0" to a "1") to capture the data from the master 1304 (e.g., from the memory controller 1202). The capture of the data is depicted in FIG. 13 in the row labeled receiver/data buffer 1308. Due to the relatively slow operation of the slow commands, which change state no faster than every 8 transfers in the exemplary solution and include IDLE transfers (e.g. for 8 transfers) before and after the command itself, the system can reliably operate using untrained high speed link(s). Although the present invention utilizes 8 transfers for each IDLE and command transfer, other transfer counts can be used based on the clock speed and accuracy of the interface logic when operated in an untrained condition. In addition, other decodes other than IDLE can be used before and after the desired command, including other valid commands, also based on the system design, performance requirements, desired communication integrity, etc. The processing depicted in FIG. 13 is an example of a slow command that operates at a slower data rate than a second data rate utilized by the high-speed memory device after it has been trained. In this example, the slow command operates at a data rate that is one eighth of the data rate utilized by commands on the high-speed link after the link has been trained and is fully operational, and also requires 16 additional "idle" transfers, resulting in a single slow command transfer occurring in the time in which 24 normal frames may have been transferred.

FIG. 14 depicts a subset of three downstream frames consistent with FIG. 10A, with only those bits involved in the "Write Slow Address/Data Buffer" slow command operation described (e.g. those bits that will comprise bits C0-C7 and D0-D8, once a high speed frame is constructed for execution in the hub device). In this example of a "Write Slow Address/Data Buffer" operation, an IDLE command (C0-C2 set to "000") is sent for 8 transfers, followed by a "Slow Command" decode (C0-C2 set to "001", indicating that a slow command is present on the bus) for 8 transfers, followed by another IDLE command for 8 transfers (e.g., the sequence of IDLE-Command-IDLE is used). The specific slow command is present on bits C3 and C4 (the decode of "01" indicates a "Write Slow Address/Data Buffer" in the exemplary embodiment (consistent with FIG. 13), with the buffer pointer present on bits C5-C7 delineating the buffer number to which the information is to be stored. Bit D0 is used to indicate that the data is to be stored in a data buffers, and the data to be written to the selected data buffer is present on bits D1-D8. Because there is no DIMM select field, all DIMMS in the cascaded channel will perform this operation.

FIG. 15 depicts a subset of three downstream frames consistent with FIG. 10A, with only those bits involved in the "Write SCOM Register from Slow Data Buffer" slow command operation, which includes only command bits C0-C7. The "Write SCOM Register from Slow Data Buffer" causes the transfer of data from a slow data buffer in the pervasive and miscellaneous logic 706 in FIG. 7 to the FCB command buffer 808 or the frame buffer 814. The address located in the slow address buffer identifies the FCB command buffer instruction registers or the frame buffer data registers in the MID. In the exemplary embodiment, these registers are "SCOM" registers, as it is possible to scan data to and from these registers using an internal scan (e.g. serial or other internal communication) path. In the example of a "Write SCOM Register from Slow Data Buffer" operation depicted in FIG. 15, an IDLE command (C0-C2 set to "000") is sent for 8 transfers, followed by a "Slow Command" decode (C0-C2 set to "001", indicating that a slow command is present on the bus) for 8 transfers, followed by another IDLE command (e.g., the sequence of IDLE-Command-IDLE is used) for 8 transfers. The specific slow command is present on bits C3 and C4 (e.g. the decode of "11" indicates a "Write SCOM Register from Slow Data Buffer" in the exemplary embodiment), with the DIMM selected present on bits C5-C7—thereby ensuring that only the selected DIMM completes the specified operation. Once the instructions and data have been loaded, CCS processing continues as described previously.

One benefit of the exemplary embodiment is that the slow commands can be processed either via the described use of the untrained high speed link(s) and/or via a separate test interface to the memory controller, processor or service processor—such as via a JTAG serial connection. In this manner, common circuitry can be used, which is already present in many devices such as this for other purposes (BOST, production test, etc), and the affected circuitry can be de-powered when not in use thereby saving in design time, die size/cost, simulation/validation of the function, etc.

In an exemplary embodiment, hub devices may be connected to the memory controller through a multi-drop or point-to-point bus structure (which may further include a cascade connection to one or more additional hub devices). Memory access requests are transmitted by the memory controller through the bus structure (e.g., the memory bus) to the selected hub(s). In response to receiving the memory access requests, the hub device translates the memory access requests to control the memory devices to store write data from the hub device or to provide read data to the hub device. Read data is encoded into one or more communication packet(s) and transmitted through the memory bus(ses) to the memory controller.

In alternate exemplary embodiments, the memory controller(s) may be integrated together with one or more processor chips and supporting logic, packaged in a discrete chip (commonly called a "northbridge" chip), included in a multi-chip carrier with the one or more processors and/or supporting logic, or packaged in various alternative forms that best match the application/environment. Any of these solutions may or may not employ one or more narrow/high speed links to connect to one or more hub chips and/or memory devices.

The memory modules may be implemented by a variety of technology including a DIMM, a single in-line memory module (SIMM) and/or other memory module or card structures. In general, a DIMM refers to a small circuit board which is comprised primarily of random access memory (RAM) integrated circuits or die on one or both sides with signal and/or power pins on both sides of the board. This can be contrasted to a SIMM which is a small circuit board or substrate composed primarily of RAM integrated circuits or die on one or both sides and single row of pins along one long edge. The DIMM depicted in FIG. 1 includes 168 pins in the exemplary embodiment, whereas subsequent DIMMs have been constructed with pincounts ranging from 100 pins to over 300 pins. In exemplary embodiments described herein, memory modules may include two or more hub devices.

In exemplary embodiments, the memory bus is constructed using multi-drop connections to hub devices on the memory modules and/or using point-to-point connections. The downstream portion of the controller interface (or memory bus), referred to as the downstream bus, may include command, address, data and other operational, initialization or status information being sent to the hub devices on the memory modules. Each hub device may simply forward the information to the subsequent hub device(s) via bypass circuitry; receive, interpret and re-drive the information if it is determined to be targeting a downstream hub device; re-drive some or all of the information without first interpreting the information to determine the intended recipient; or perform a subset or combination of these options.

The upstream portion of the memory bus, referred to as the upstream bus, returns requested read data and/or error, status or other operational information, and this information may be forwarded to the subsequent hub devices via bypass circuitry; be received, interpreted and re-driven if it is determined to be targeting an upstream hub device and/or memory controller in the processor complex; be re-driven in part or in total without first interpreting the information to determine the intended recipient; or perform a subset or combination of these options.

In alternate exemplary embodiments, the point-to-point bus includes a switch or bypass mechanism which results in the bus information being directed to one of two or more possible hub devices during downstream communication (communication passing from the memory controller to a hub device on a memory module), as well as directing upstream information (communication from a hub device on a memory module to the memory controller), often by way of one or more upstream hub devices. Further embodiments include the use of continuity modules, such as those recognized in the art, which, for example, can be placed between the memory controller and a first populated hub device (i.e., a hub device that is in communication with one or more memory devices), in a cascade interconnect memory system, such that any intermediate hub device positions between the memory controller and the first populated hub device include a means by which information passing between the memory controller and the first populated hub device can be received even if the one or more intermediate hub device position(s) do not include a hub device. The continuity module(s) may be installed in any module position(s), subject to any bus restrictions, including the first position (closest to the main memory controller, the last position (prior to any included termination) or any intermediate position(s). The use of continuity modules may be especially beneficial in a multi-module cascade interconnect bus structure, where an intermediate hub device on a memory module is removed and replaced by a continuity module, such that the system continues to operate after the removal of the intermediate hub device. In more common embodiments, the continuity module(s) would include either interconnect wires to transfer all required signals from the input(s) to the corresponding output(s), or be re-driven through a repeater device. The continuity module(s) might further include a non-volatile storage device (such as an EEPROM), but would not include main memory storage devices.

In exemplary embodiments, the memory system includes one or more hub devices on one or more memory modules connected to the memory controller via a cascade interconnect memory bus, however other memory structures may be implemented such as a point-to-point bus, a multi-drop memory bus or a shared bus. Depending on the signaling methods used, the target operating frequencies, space, power, cost, and other constraints, various alternate bus structures may be considered. A point-to-point bus may provide the optimal performance in systems produced with electrical interconnections, due to the reduced signal degradation that may occur as compared to bus structures having branched signal lines, switch devices, or stubs. However, when used in systems requiring communication with multiple devices or subsystems, this method will often result in significant added component cost and increased system power, and may reduce the potential memory density due to the need for intermediate buffering and/or re-drive.

Although not shown in the Figures, the memory modules or hub devices may also include a separate bus, such as a 'presence detect' bus, an I2C bus and/or an SMBus which is used for one or more purposes including the determination of the hub device an/or memory module attributes (generally after power-up), the reporting of fault or status information to the system, the configuration of the hub device(s) and/or memory subsystem(s) after power-up or during normal operation or other purposes. Depending on the bus characteristics, this bus might also provide a means by which the valid completion of operations could be reported by the hub devices and/or memory module(s) to the memory controller(s), or the identification of failures occurring during the execution of the main memory controller requests.

Performances similar to those obtained from point-to-point bus structures can be obtained by adding switch devices. These and other solutions offer increased memory packaging density at lower power, while retaining many of the characteristics of a point-to-point bus. Multi-drop busses provide an alternate solution, albeit often limited to a lower operating frequency, but at a cost/performance point that may be advantageous for many applications. Optical bus solutions permit significantly increased frequency and bandwidth potential, either in point-to-point or multi-drop applications, but may incur cost and space impacts.

As used herein the term "buffer" or "buffer device" refers to a temporary storage unit (as in a computer), especially one that accepts information at one rate and delivers it another. In exemplary embodiments, a buffer is an electronic device that provides compatibility between two signals (e.g., changing voltage levels or current capability). The term "hub" is sometimes used interchangeably with the term "buffer." A hub is a device containing multiple ports that is connected to several other devices. A port is a portion of an interface that serves a congruent I/O functionality (e.g., a port may be utilized for sending and receiving data, address, and control information over one of the point-to-point links, or busses). A hub may be a central device that connects several systems, subsystems, or networks together. A passive hub may simply forward messages, while an active hub, or repeater, amplifies and refreshes the stream of data which otherwise would deteriorate over a distance. The term hub device, as used herein, refers to a hub chip that includes logic (hardware and/or software) for performing memory functions.

Also as used herein, the term "bus" refers to one of the sets of conductors (e.g., wires, and printed circuit board traces or connections in an integrated circuit) connecting two or more functional units in a computer. The data bus, address bus and control signals, despite their names, constitute a single bus since each are often useless without the others. A bus may include a plurality of signal lines, each signal line having two or more connection points, that form a main transmission path that electrically connects two or more transceivers, transmitters and/or receivers. The term "bus" is contrasted with the term "channel" which is often used to describe the function of a "port" as related to a memory controller in a memory system, and which may include one or more busses or sets of busses. The term "channel" as used herein refers to a port on a memory controller. Note that this term is often used in conjunction with I/O or other peripheral equipment, however the term channel has been adopted by some to describe the interface between a processor or memory controller and one of one or more memory subsystem(s).

Further, as used herein, the term "daisy chain" refers to a bus wiring structure in which, for example, device A is wired to device B, device B is wired to device C, etc. The last device is typically wired to a resistor or terminator. All devices may receive identical signals or, in contrast to a simple bus, each device may modify one or more signals before passing them on. A "cascade" or cascade interconnect' as used herein refers to a succession of stages or units or a collection of interconnected networking devices, typically hubs, in which the hubs operate as a logical repeater, further permitting merging data to be concentrated into the existing data stream. Also as used herein, the term "point-to-point" bus and/or link refers to one or a plurality of signal lines that may each include one or more terminators. In a point-to-point bus and/or link, each signal line has two transceiver connection points, with each transceiver connection point coupled to transmitter circuitry, receiver circuitry or transceiver circuitry. A signal line refers to one or more electrical conductors or optical carriers, generally configured as a single carrier or as two or more carriers, in a twisted, parallel, or concentric arrangement, used to transport at least one logical signal.

Memory devices are generally defined as integrated circuits that are composed primarily of memory (storage) cells, such as DRAMs (Dynamic Random Access Memories), SRAMs (Static Random Access Memories), FeRAMs (Ferro-Electric RAMs), MRAMs (Magnetic Random Access Memories), Flash Memory and other forms of random access and related memories that store information in the form of electrical, optical, magnetic, biological or other means. Dynamic memory device types may include asynchronous memory devices such as FPM DRAMs (Fast Page Mode Dynamic Random Access Memories), EDO (Extended Data Out) DRAMs, BEDO (Burst EDO) DRAMs, SDR (Single Data Rate) Synchronous DRAMs, DDR (Double Data Rate) Synchronous DRAMs or any of the expected follow-on devices such as DDR2, DDR3, DDR4 and related technologies such as Graphics RAMs, Video RAMs, LP RAM (Low Power DRAMs) which are often based on the fundamental functions, features and/or interfaces found on related DRAMs.

Memory devices may be utilized in the form of chips (die) and/or single or multi-chip packages of various types and configurations. In multi-chip packages, the memory devices may be packaged with other device types such as other memory devices, logic chips, analog devices and programmable devices, and may also include passive devices such as resistors, capacitors and inductors. These packages may include an integrated heat sink or other cooling enhancements, which may be further attached to the immediate carrier or another nearby carrier or heat removal system.

Module support devices (such as buffers, hubs, hub logic chips, registers, PLL's, DLL's, non-volatile memory, etc) may be comprised of multiple separate chips and/or components, may be combined as multiple separate chips onto one or more substrates, may be combined onto a single package or even integrated onto a single device—based on technology, power, space, cost and other tradeoffs. In addition, one or more of the various passive devices such as resistors, capacitors may be integrated into the support chip packages, or into the substrate, board or raw card itself, based on technology, power, space, cost and other tradeoffs. These packages may include an integrated heat sink or other cooling enhancements, which may be further attached to the immediate carrier or another nearby carrier or heat removal system.

Memory devices, hubs, buffers, registers, clock devices, passives and other memory support devices and/or components may be attached to the memory subsystem and/or hub device via various methods including solder interconnects, conductive adhesives, socket structures, pressure contacts and other methods which enable communication between the two or more devices via electrical, optical or alternate means.

The one or more memory modules (or memory subsystems) and/or hub devices may be electrically connected to the memory system, processor complex, computer system or other system environment via one or more methods such as soldered interconnects, connectors, pressure contacts, conductive adhesives, optical interconnects and other communication and power delivery methods. Connector systems may include mating connectors (male/female), conductive contacts and/or pins on one carrier mating with a male or female connector, optical connections, pressure contacts (often in conjunction with a retaining mechanism) and/or one or more of various other communication and power delivery methods. The interconnection(s) may be disposed along one or more edges of the memory assembly and/or placed a distance from an edge of the memory subsystem depending on such application requirements as ease-of-upgrade/repair, available space/volume, heat transfer, component size and shape and other related physical, electrical, optical, visual/physical access, etc. Electrical interconnections on a memory module are often referred to as contacts, or pins, or tabs. Electrical interconnections on a connector are often referred to as contacts or pins.

As used herein, the term memory subsystem refers to, but is not limited to: one or more memory devices; one or more memory devices and associated interface and/or timing/control circuitry; and/or one or more memory devices in conjunction with a memory buffer, hub device, and/or switch. The term memory subsystem may also refer to one or more memory devices, in addition to any associated interface and/or timing/control circuitry and/or a memory buffer, hub device or switch, assembled into a substrate, a card, a module or related assembly, which may also include a connector or similar means of electrically attaching the memory subsystem with other circuitry. The memory modules described herein may also be referred to as memory subsystems because they include one or more memory devices and hub devices Additional functions that may reside local to the memory subsystem and/or hub device include write and/or read buffers, one or more levels of memory cache, local pre-fetch logic, data encryption/decryption, compression/decompression, protocol translation, command prioritization logic, voltage and/or level translation, error detection and/or correction circuitry, data scrubbing, local power management circuitry and/or reporting, operational and/or status registers, initialization circuitry, performance monitoring and/or control, one or more co-processors, search engine(s) and other functions that may have previously resided in other memory subsystems. By placing a function local to the memory subsystem, added performance may be obtained as related to the specific function, often while making use of unused circuits within the subsystem.

Memory subsystem support device(s) may be directly attached to the same substrate or assembly onto which the memory device(s) are attached, or may be mounted to a separate interposer or substrate also produced using one or more of various plastic, silicon, ceramic or other materials which include electrical, optical or other communication paths to functionally interconnect the support device(s) to the memory device(s) and/or to other elements of the memory or computer system.

Information transfers (e.g. packets) along a bus, channel, link or other naming convention applied to an interconnection method may be completed using one or more of many signaling options. These signaling options may include such methods as single-ended, differential, optical or other approaches, with electrical signaling further including such methods as voltage or current signaling using either single or multi-level approaches. Signals may also be modulated using such methods as time or frequency, non-return to zero, phase shift keying, amplitude modulation and others. Voltage levels are expected to continue to decrease, with 1.5V, 1.2V, 1V and lower signal voltages expected consistent with (but often independent of) the reduced power supply voltages required for the operation of the associated integrated circuits themselves.

One or more clocking methods may be utilized within the memory subsystem and the memory system itself, including global clocking, source-synchronous clocking, encoded clocking or combinations of these and other methods. The clock signaling may be identical to that of the signal lines themselves, or may utilize one of the listed or alternate methods that is more conducive to the planned clock frequency (ies), and the number of clocks planned within the various subsystems. A single clock may be associated with all communication to and from the memory, as well as all clocked functions within the memory subsystem, or multiple clocks may be sourced using one or more methods such as those described earlier. When multiple clocks are used, the functions within the memory subsystem may be associated with a clock that is uniquely sourced to the subsystem, or may be based on a clock that is derived from the clock related to the information being transferred to and from the memory subsystem (such as that associated with an encoded clock). Alternately, a unique clock may be used for the information transferred to the memory subsystem, and a separate clock for information sourced from one (or more) of the memory subsystems. The clocks themselves may operate at the same or frequency multiple of the communication or functional frequency, and may be edge-aligned, center-aligned or placed in an alternate timing position relative to the data, command or address information.

Information passing to the memory subsystem(s) will generally be composed of address, command and data, as well as other signals generally associated with requesting or reporting status or error conditions, resetting the memory, completing memory or logic initialization and other functional, configuration or related information. Information passing from the memory subsystem(s) may include any or all of the information passing to the memory subsystem(s), however generally will not include address and command information. This information may be communicated using communication methods that may be consistent with normal memory device interface specifications (generally parallel in nature), the information may be encoded into a 'packet' structure, which may be consistent with future memory interfaces or simply developed to increase communication bandwidth and/or enable the subsystem to operate independently of the memory technology by converting the received information into the format required by the receiving device(s).

Initialization of the memory subsystem may be completed via one or more methods, based on the available interface busses, the desired initialization speed, available space, cost/complexity objectives, subsystem interconnect structures, the use of alternate processors (such as a service processor) which may be used for this and other purposes, etc. In one embodiment, the high speed bus may be used to complete the initialization of the memory subsystem(s), generally by first completing a training process to establish reliable communication, then by interrogation of the attribute or 'presence detect' data associated the various components and/or characteristics associated with that subsystem, and ultimately by programming the appropriate devices with information associated with the intended operation within that system. In a cascaded system, communication with the first memory subsystem would generally be established, followed by subsequent (downstream) subsystems in the sequence consistent with their position along the cascade interconnect bus.

A second initialization method would include one in which the high speed bus is operated at one frequency during the initialization process, then at a second (and generally higher) frequency during the normal operation. In this embodiment, it may be possible to initiate communication with all of the memory subsystems on the cascade interconnect bus prior to completing the interrogation and/or programming of each subsystem, due to the increased timing margins associated with the lower frequency operation.

A third initialization method might include operation of the cascade interconnect bus at the normal operational frequency (ies), while increasing the number of cycles associated with each address, command and/or data transfer. In one embodiment, a packet containing all or a portion of the address, command and/or data information might be transferred in one clock cycle during normal operation, but the same amount and/or type of information might be transferred over two, three or more cycles during initialization. This initialization process would therefore be using a form of 'slow' commands, rather than 'normal' commands, and this mode might be automatically entered at some point after power-up and/or re-start by each of the subsystems and the memory controller by way of POR (power-on-reset) logic included in each of these subsystems.

A fourth initialization method might utilize a distinct bus, such as a presence detect bus (such as the one defined in U.S. Pat. No. 5,513,135 to Dell et al., of common assignment herewith), an I2C bus (such as defined in published JEDEC standards such as the 168 Pin DIMM family in publication 21-C revision 7R8) and/or the SMBUS, which has been widely utilized and documented in computer systems using such memory modules. This bus might be connected to one or more modules within a memory system in a daisy chain/ cascade interconnect, multi-drop or alternate structure, providing an independent means of interrogating memory subsystems, programming each of the one or more memory subsystems to operate within the overall system environment, and adjusting the operational characteristics at other times during the normal system operation based on performance, thermal, configuration or other changes desired or detected in the system environment.

Other methods for initialization can also be used, in conjunction with or independent of those listed. The use of a separate bus, such as described in the fourth embodiment above, also offers the advantage of providing an independent means for both initialization and uses other than initialization, such as described in U.S. Pat. No. 6,381,685 to Dell et al., of common assignment herewith, including changes to the subsystem operational characteristics on-the-fly and for the reporting of and response to operational subsystem information such as utilization, temperature data, failure information or other purposes.

With improvements in lithography, better process controls, the use of materials with lower resistance, increased field sizes and other semiconductor processing improvements, increased device circuit density (often in conjunction with increased die sizes) will help facilitate increased function on integrated devices as well as the integration of functions previously implemented on separate devices. This integration will serve to improve overall performance of the intended function, as well as promote increased storage density, reduced power, reduced space requirements, lower cost and other manufacturer and customer benefits. This integration is a natural evolutionary process, and may result in the need for structural changes to the fundamental building blocks associated with systems.

The integrity of the communication path, the data storage contents and all functional operations associated with each element of a memory system or subsystem can be assured, to a high degree, with the use of one or more fault detection and/or correction methods. Any or all of the various elements may include error detection and/or correction methods such as CRC (Cyclic Redundancy Code), EDC (Error Detection and Correction), parity or other encoding/decoding methods suited for this purpose. Further reliability enhancements may include operation re-try (to overcome intermittent faults such as those associated with the transfer of information), the use of one or more alternate or replacement communication paths to replace failing paths and/or lines, complement-re-complement techniques or alternate methods used in computer, communication and related systems.

The use of bus termination, on busses as simple as point-to-point links or as complex as multi-drop structures, is becoming more common consistent with increased performance demands. A wide variety of termination methods can be identified and/or considered, and include the use of such devices as resistors, capacitors, inductors or any combination thereof, with these devices connected between the signal line and a power supply voltage or ground, a termination voltage or another signal. The termination device(s) may be part of a passive or active termination structure, and may reside in one or more positions along one or more of the signal lines, and/or as part of the transmitter and/or receiving device(s). The terminator may be selected to match the impedance of the transmission line, or selected via an alternate approach to maximize the useable frequency, operating margins and related attributes within the cost, space, power and other constraints.

Technical effects and benefits include the ability to verify the operability of the integrated BIST functions. This may be performed using the failure detection and recovery mechanisms of the MID, memory array, or other BIST engine(s)/ exerciser routines sourced from such devices as the memory controller or processor (MC/uP). Valid data locations in memory arrays may be overwritten with invalid data to verify that the BIST engines can detect locations with invalid data. The verification may be preformed in a situation-dependent manner, without the need for a processing device (e.g. an MC/uP) to directly control the operation, or to be connected to the MID at all.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is clamed is:

1. A memory interface device (MID) for use in a cascade interconnect system and in communication with one or more memory devices, the MID comprising:
   a first connection to a high speed bus for operating at a first data rate, the first connection including receiver circuitry operating at the first data rate;
   a second connection to the high speed bus;
   an alternate communication means for operating at a second data rate that is slower than the first data rate, the second data rate set by a programmable timing circuit; and
   logic for facilitating:
      receiving commands via the first connection from the high speed bus operating at the first data rate and using a first command sequence;
      receiving the commands via the alternate communication means using a second command sequence which differs from the first command sequence in the speed in which the commands are transferred, wherein the second command sequence comprises one or more idle transfers;
processing the commands received via the alternate communication means as if the commands are directed to the MID; and
redriving the commands received via the alternate communication means onto the high speed bus if the commands are directed to a downstream MID, the redriving via the second connection to the high speed bus.

2. The MID of claim 1 wherein the receiving the commands via the alternate communication means comprises:
receiving information including data and instructions at the second data rate via the alternate communication means; and
transferring all or a subset of the data to the receiver circuitry operating at the first data rate, the all or a subset selected in response to the instructions.

3. The MID of claim 1 wherein the alternate communication means is a serial interface.

4. The MID of claim 3 wherein the serial interface is a joint test action group (JTAG) interface or a field service interface (FSI).

5. The MID of claim 1 wherein the alternate communication means is the high speed bus operating in an untrained state.

6. The MID of claim 1 wherein the processing includes one or more of reading and writing to one or more of the memory devices in response to the commands.

7. The MID of claim 1 wherein the processing includes performing an operational or functional instruction loop to facilitate problem determination.

8. The MID of claim 1 wherein the alternate communication means is utilized when the high speed bus is not available.

9. The MID of claim 1 wherein the second command sequence is substantially the same as the first command sequence with the second command sequence requiring a greater number of transfers to receive each command.

10. The MID of claim 1 wherein the commands received via the alternate communication means are stored in the MID for later processing.

11. A cascade interconnect system comprising:
a memory controller for generating commands;
a high speed bus in communication with the memory controller; and
one or more MIDs cascade interconnected with the memory controller via the high speed bus, at least one of the MIDs in communication with one or more memory devices and comprising:
a first connection to the high speed bus for operating at a first data rate, the first connection including receiver circuitry operating at the first data rate;
a second connection to the high speed bus;
an alternate communication means for operating at a second data rate that is slower than the first data rate, the second data rate set by a programmable timing circuit; and
logic for facilitating:
receiving the commands via the first connection from the high speed bus operating at the first data rate and using a first command sequence;
receiving the commands via the alternate communication means using a second command sequence which differs from the first command sequence in the speed in which the commands are transferred, wherein the second command sequence comprises one or more idle transfers;
processing the commands received via the alternate communication means as if the commands are directed to the MID; and
redriving the commands received via the alternate communication means onto the high speed bus if the commands are directed to a downstream MID, the redriving via the second connection to the high speed bus.

12. The system of claim 11 wherein the receiving the commands via the alternate communication means comprises:
receiving information including data and instructions at the second data rate via the alternate communication means; and
transferring all or a subset of the data to the receiver circuitry operating at the first data rate, the all or a subset selected in response to the instructions.

13. The system of claim 11 wherein the alternate communication means is a serial interface.

14. The system of claim 11 wherein the alternate communication means is the high speed bus operating in an untrained state.

15. The system of claim 11 wherein the processing includes one or more of reading and writing to one or more of the memory devices in response to the commands.

16. The system of claim 11 wherein the processing includes performing an operational or functional instruction loop to facilitate problem determination.

17. The system of claim 11 wherein the alternate communication means is utilized when the high speed bus is not available.

18. The system of claim 11 wherein the commands are received from the memory controller or an other MID.

19. A memory interface device (MID) intended for use in a cascade interconnect system and in communication with one or more memory devices, the MID comprising:
a first connection to a high speed bus, the high speed bus for operating at a first data rate, the first connection including receiver circuitry operating at the first data rate;
a second connection to the high speed bus;
an alternate communication means for operating at a second data rate that is slower than the first data rate , the second data rate set by a programmable timing circuit; and
logic for facilitating:
utilizing the alternate communication means as a service interface to the MID including receiving and processing service interface instructions; and
utilizing the alternate communication means as a backup to the high speed bus including:
receiving a command via the alternate communication means using a second command sequence which differs from the first command sequence in the speed in which the commands are transferred, wherein the second command sequence comprises one or more idle transfers;
processing the command if the command is directed to the MID, the processing including transferring all or a subset of the command to the receiver circuitry operating at the first data rate; and
redriving the command onto the high speed bus via the second connection to the high speed bus if the command is directed to a downstream MID.

20. The MID of claim 19, wherein the processing includes one or more of reading and writing to one or more of the memory devices in response to the command.

* * * * *